(12) United States Patent
Hara

(10) Patent No.: US 11,817,136 B2
(45) Date of Patent: Nov. 14, 2023

(54) DISK DEVICE

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/892,917

(22) Filed: Aug. 22, 2022

(65) Prior Publication Data

US 2023/0142495 A1 May 11, 2023

(30) Foreign Application Priority Data

Nov. 5, 2021 (JP) .................................. 2021-181249

(51) Int. Cl.
G11B 5/596 (2006.01)
G11B 5/55 (2006.01)

(52) U.S. Cl.
CPC .......... *G11B 5/5582* (2013.01); *G11B 5/5547* (2013.01); *G11B 5/5578* (2013.01)

(58) Field of Classification Search
None
See application file for complete search history.

(56) References Cited

U.S. PATENT DOCUMENTS

| 7,599,144 | B2 * | 10/2009 | Suh .......................... G11B 5/40 360/77.02 |
| 9,911,442 | B1 | 3/2018 | Kharisov et al. |
| 10,043,543 | B1 | 8/2018 | Buch et al. |
| 10,741,210 | B1 | 8/2020 | Hillukka et al. |

* cited by examiner

*Primary Examiner* — K. Wong
(74) *Attorney, Agent, or Firm* — Allen & Overy LLP

(57) ABSTRACT

According to an embodiment, in a disk device, a first actuator moves a first head with respect to a first surface of a first disk. A controller controls positioning of the first head via the first actuator and controls a write operation to the first disk by the first head. The controller acquires information regarding a state of a vibration source, changes a value of a coefficient for estimating a predicted position of the first head according to the information regarding the state of the vibration source, estimates a predicted position of the first head with the value of the coefficient changed, performs a write operation by the first head in a case where the predicted position estimated is equal to or less than a threshold, and prohibits the write operation by the first head in a case where the predicted position estimated exceeds the threshold.

20 Claims, 15 Drawing Sheets

FIG.5B

PREDICTED POSITION COEFFICIENT TABLE

| HEAD IDENTIFIER | FREQUENCY LEVEL | PREDICTED POSITION COEFFICIENT | |
|---|---|---|---|
| 0 | 0 | a (0, 0) | b (0, 0) |
|   | 1 | a (0, 1) | b (0, 1) |
|   | ⋮ | ⋮ | ⋮ |
|   | M | a (0, M) | b (0, M) |
| 1 | 0 | a (1, 0) | b (1, 0) |
|   | 1 | a (1, 1) | b (1, 1) |
|   | ⋮ | ⋮ | ⋮ |
|   | M | a (1, M) | b (1, M) |

FIG.5A

VIBRATION FREQUENCY LEVEL DEFINITION TABLE

| FREQUENCY RANGE | FREQUENCY LEVEL |
|---|---|
| F0 TO F1 | 0 |
| F1 TO F2 | 1 |
| F2 TO F3 | 2 |
| F3 TO F4 | 3 |
| F4 TO F5 | 4 |
| F5 TO F6 | 5 |
| ⋮ | ⋮ |
| FM TO F(M+1) | M |

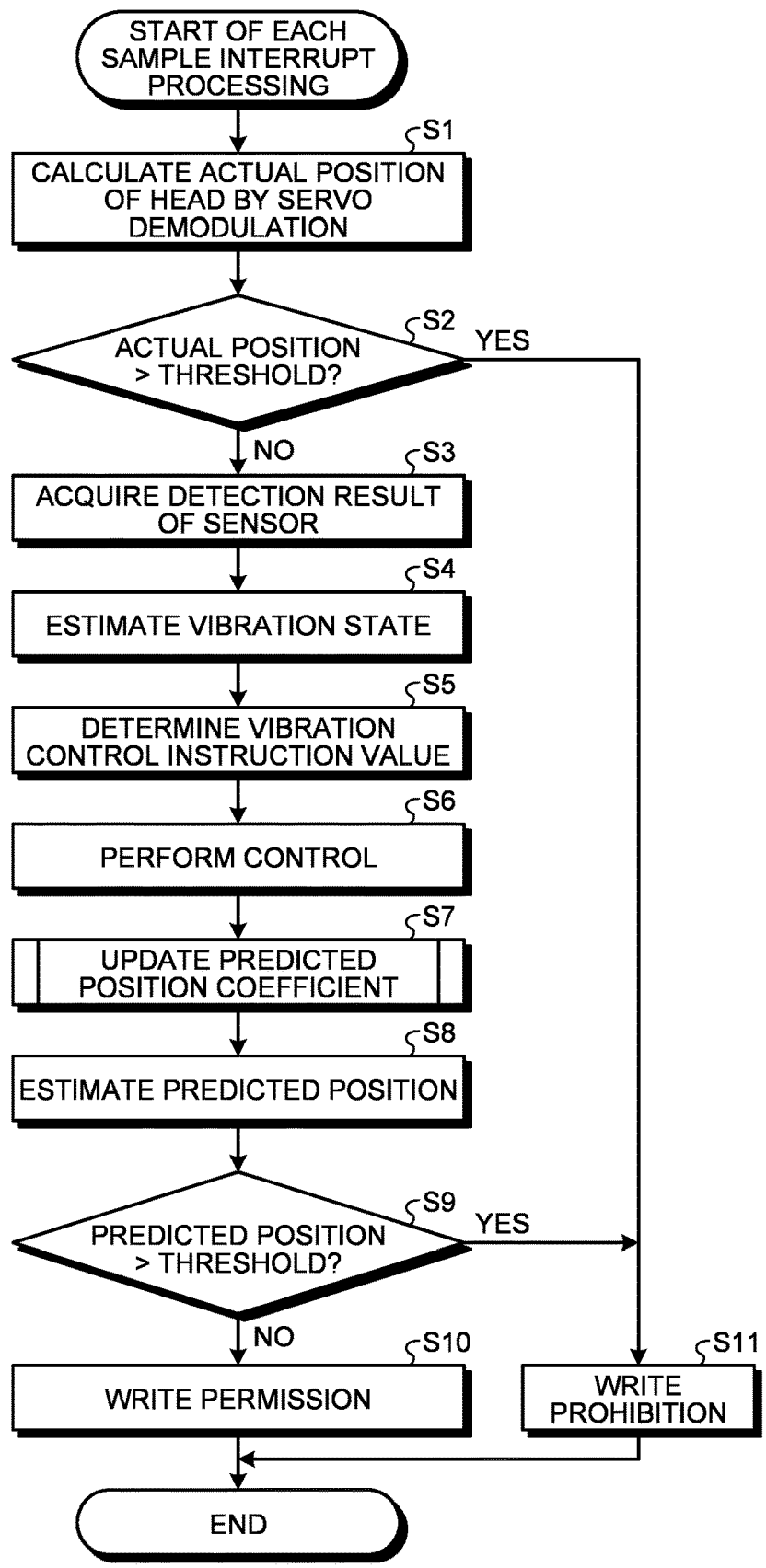

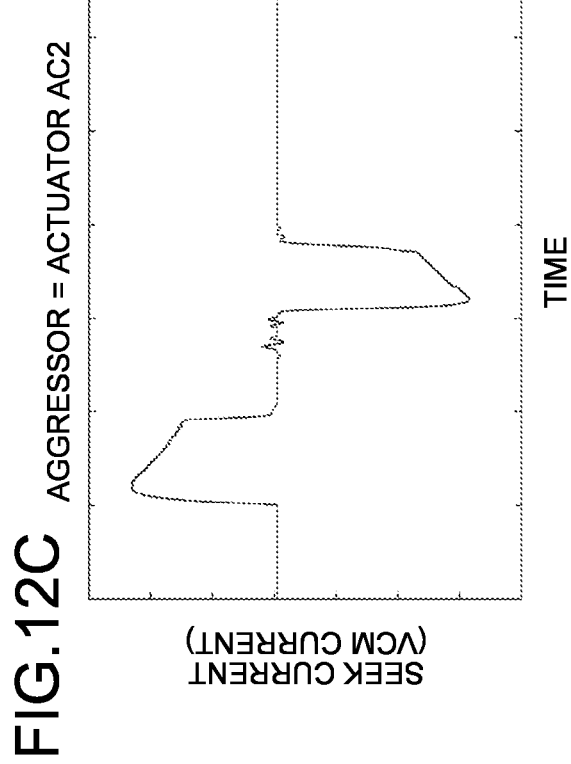
FIG.12A AGGRESSOR = ACTUATOR AC2
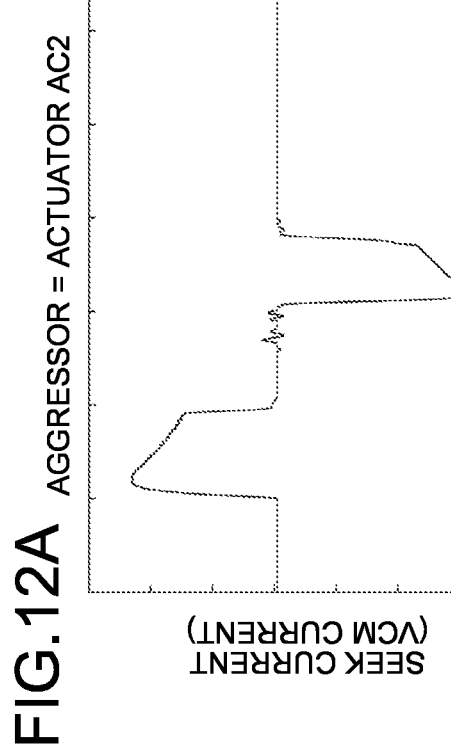
FIG.12B VICTIM = ACTUATOR AC1
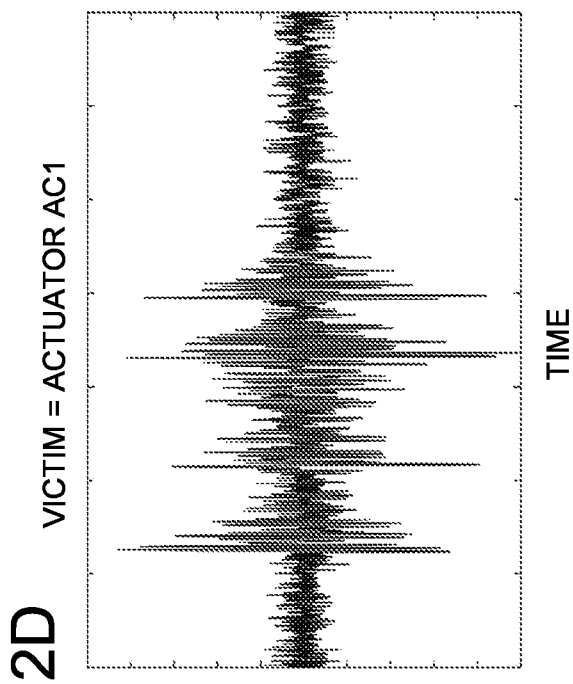
FIG.12C AGGRESSOR = ACTUATOR AC2
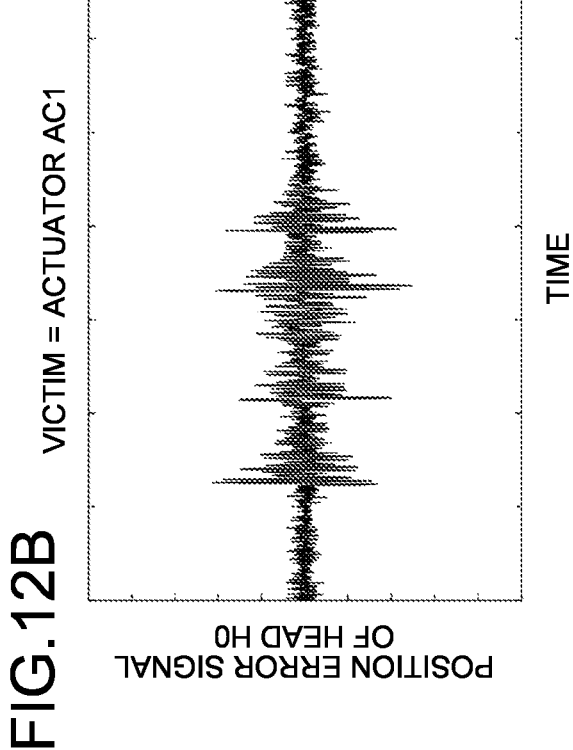
FIG.12D VICTIM = ACTUATOR AC1

FIG.13A

OPERATION MODE DEFINITION OF OTHER ACTUATOR

| OPERATION STATE | | MODE |
|---|---|---|
| IN TRACKING | | 0 |
| FAN VIBRATING | | 1 |
| IN SEEKING | ACCELERATION RISE | 2 |
| | ACCELERATION FALL | 3 |
| | CONSTANT SPEED | 4 |
| | DECELERATION RISE | 5 |
| | DECELERATION FALL | 6 |
| ⋮ | | ⋮ |
| IN SETTLING | | M |

FIG.13B

PREDICTED POSITION COEFFICIENT TABLE

| HEAD IDENTIFIER | MODE | PREDICTED POSITION COEFFICIENT | |
|---|---|---|---|
| 0 | 0 | a (0, 0) | b (0, 0) |
| | 1 | a (0, 1) | b (0, 1) |
| | ⋮ | ⋮ | ⋮ |
| | M | a (0, M) | b (0, M) |
| 1 | 0 | a (1, 0) | b (1, 0) |
| | 1 | a (1, 1) | b (1, 1) |
| | ⋮ | ⋮ | ⋮ |
| | M | a (1, M) | b (1, M) |
| 2 | 0 | a (2, 0) | b (2, 0) |
| | 1 | a (2, 1) | b (2, 1) |
| | ⋮ | ⋮ | ⋮ |
| | M | a (2, M) | b (2, M) |
| 3 | 0 | a (3, 0) | b (3, 0) |
| | 1 | a (3, 1) | b (3, 1) |
| | ⋮ | ⋮ | ⋮ |
| | M | a (3, M) | b (3, M) |

DISK DEVICE

CROSS-REFERENCE TO RELATED APPLICATIONS

This application is based upon and claims the benefit of priority from Japanese Patent Application No. 2021-181249, filed on Nov. 5, 2021; the entire contents of which are incorporated herein by reference.

FIELD

Embodiments described herein relate generally to a disk device.

BACKGROUND

In a disk device having a head and a disk, the head is moved with respect to a surface of the disk, and a write operation to the disk is performed by the head. In the disk device, it is desirable that the write operation is appropriately performed.

BRIEF DESCRIPTION OF THE DRAWINGS

FIGS. 5A and 5B are diagrams illustrating a data structure of coefficient information in the first embodiment;

FIG. 6 is a flowchart illustrating an operation in tracking of the disk device according to the first embodiment;

FIGS. 12A to 12D are diagrams illustrating changes in the seek current and the position error signal according to vibration in the second embodiment;

FIGS. 13A and 13B are diagrams illustrating a data structure of coefficient information in the second embodiment;

DETAILED DESCRIPTION

In general, according to one embodiment, there is provided a disk device including a first disk, a first head, a first actuator and a controller. The first actuator moves the first head with respect to a first surface of the first disk. The controller controls positioning of the first head via the first actuator and controls a write operation to the first disk by the first head. The controller acquires information regarding a state of a vibration source, changes a value of a coefficient for estimating a predicted position of the first head according to the information regarding the state of the vibration source, estimates a predicted position of the first head with the value of the coefficient changed, performs a write operation by the first head in a case where the predicted position estimated is equal to or less than a threshold, and prohibits the write operation by the first head in a case where the predicted position estimated exceeds the threshold.

Exemplary embodiments of a disk device will be explained below in detail with reference to the accompanying drawings. The present invention is not limited to the following embodiments.

First Embodiment

In the disk device according to a first embodiment, a write prohibition determination based on the predicted position of the head is performed, and a device for improving the accuracy of the write prohibition determination is provided.

Figure 1:
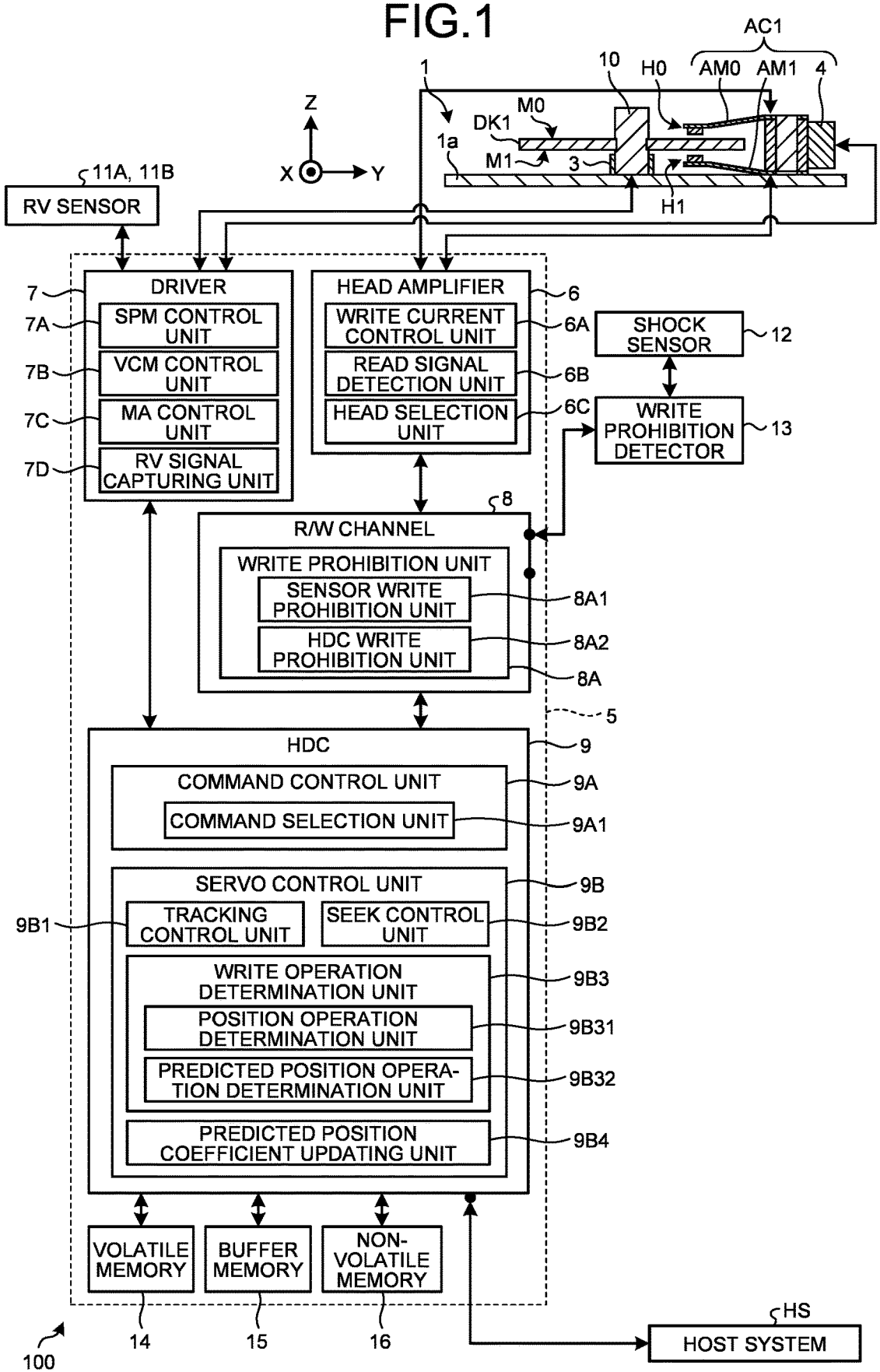
FIG. 1 is a diagram illustrating a configuration of a disk device according to a first embodiment.

For example, the disk device 100 is configured as illustrated in FIG. 1. FIG. 1 is a diagram illustrating a configuration of a disk device 100, in which a part of the configuration of the disk device 100 is illustrated in a cross-sectional view and the other part is illustrated in a block diagram. Hereinafter, a direction along the rotation axis of the disk DK1 is referred to as a Z direction, and two directions orthogonal to each other in a plane perpendicular to the Z direction are referred to as an X direction and a Y direction.

The disk device 100 includes a housing 1, a disk DK1, a head H0, a head H1, an actuator AC1, a spindle motor 3, a spindle 10, rotational vibration (RV) sensors 11A and 11B, a shock sensor 12, a write prohibition detector 13, and a controller 5.

The housing 1 includes a base 1a extending in a flat plate shape in the X and Y directions and a cover 1b which is not illustrated. The disk DK1, the head H0, the actuator AC1, the spindle motor (SPM) 3, the spindle 10, the RV sensor 11, the shock sensor 12, and the write prohibition detector 13 are accommodated in a space where the cover 1b closes the base 1a from a +Z side.

Figure 2:
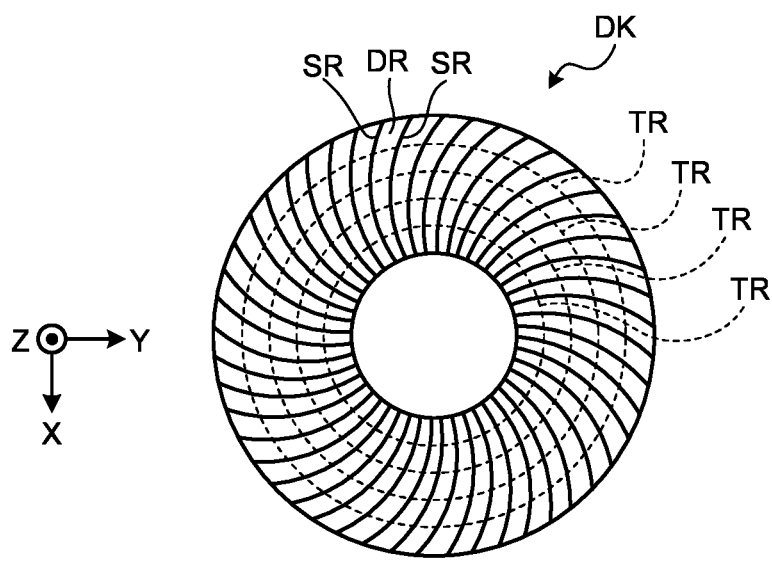
FIG. 2 is a plan view illustrating a configuration of a disk in the first embodiment.

As illustrated in FIG. 2, the disk DK1 is a substantially disk-shaped medium on which information is to be recorded. FIG. 2 is a plan view illustrating a configuration of the disk DK1. The disk DK1 is supported by the base of the housing 1 via the spindle 10 so as to be rotatable about the Z axis. The disk DK1 may be a magnetic disk or a magneto-optical disk. Hereinafter, a case where the disk DK1 is a magnetic disk will be mainly exemplified. The disk DK1 has a recording surface M0 on the +Z side and a recording surface M1 on a −Z side. In the disk DK1, plural tracks TR concentric in a radial direction are defined by servo information written in advance in a radial servo region SR on each of the recording surfaces M0 and M1. An area between servo regions SR on each of the recording surfaces M0 and M1 of the disk DK1 is a data region DR in which data can be written. Each track TR includes one or more sets of the servo region SR and the data region DR in a circumferential direction.

The head H0 illustrated in FIG. 1 is held by the actuator AC1 and disposed so as to face the recording surface M0 of the disk DK1. The head H1 is held by the actuator AC1 and is disposed so as to face the recording surface M1 of the disk DK1. Each of the heads H0 and H1 includes a write head and a read head. The actuator AC1 moves the heads H0 and H1 with respect to the recording surfaces M0 and M1 at the time of seek or the like, and positions the heads H0 and H1 to one of the plural tracks TR.

The actuator AC1 includes a voice coil motor (VCM) 4 and actuator arms AM0 and AM1. The head H0 is provided at a position on the disk DK1 side (recording surface M0 side) at a distal end of the actuator arm AM0. The head H1 is provided at a position on the disk DK1 side (recording surface M1 side) at a distal end of the actuator arm AM1.

Note that the actuator AC1 may further include microactuators MA0 and MA1. In this case, the microactuators MA0 and MA1 are provided at the distal ends of the actuator arms AM0 and AM1. The head H0 is provided at a position on the disk DK1 side (recording surface M0 side) at a distal end of the microactuator MA0. The head H1 is provided at a position on the disk DK1 side (recording surface M1 side) at a distal end of the microactuator MA1.

Figure 3:
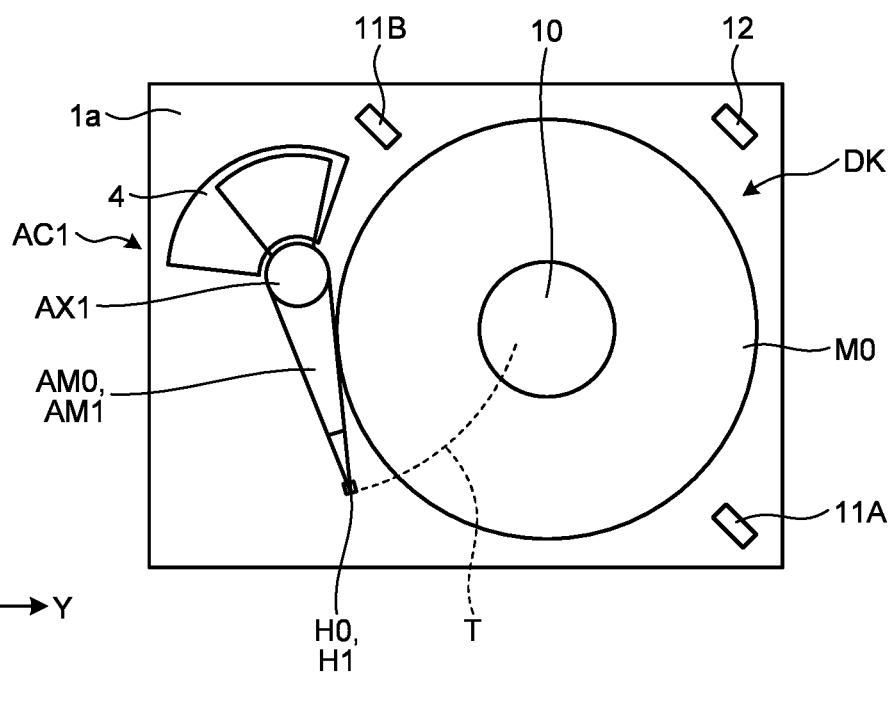
FIG. 3 is a plan view illustrating positioning of a head in the first embodiment.

At the time of seek or the like, the actuator AC1 drives the actuator arms AM0 and AM1 with a shaft AX1 as a rotation center by the voice coil motor 4 as illustrated in FIG. 3. FIG. 3 is a view illustrating positioning of the heads H0 and H1. In a case where the actuator arms AM0 and AM1 are configured to rotate simultaneously, the actuator AC1 may move and position the heads H0 and H1 simultaneously.

For example, the actuator AC1 causes the heads H0 and H1 to seek in a horizontal direction on a trajectory T via the actuator arms AM0 and AM1, and positions the heads H0 or H1 to the target track TR. The actuator AC1 causes the heads H0 or H1 to track on the target track TR.

The actuator arms AM0 and AM1 illustrated in FIG. 1 can keep flying heights of the heads H0 and H1 on the +Z side and the −Z side of the recording surfaces M0 and M1 of the disk DK1 constant by applying, to the heads H0 and H1, a pressing force against the flying force of the heads H0 and H1 due to airflow when the disk DK1 rotates. The spindle motor 3 rotates the magnetic disk DK1 around the spindle 10. The voice coil motor 4 and the spindle motor 3 are fixed to the base 1a of the housing 1.

Each of the RV sensors 11A and 11B and the shock sensor 12 detects vibration of a vibration source. The vibration source is a source of vibration that can be exerted on the actuator AC1.

As illustrated in FIG. 3, the RV sensors 11A and 11B are fixed to the base 1a of the housing 1 at positions with the disk DK1 interposed therebetween in an XY plane direction. Each of the RV sensors 11A and 11B can detect the amount of vibration in the X direction and the Y direction. The difference between a detection value of the RV sensor 11A and a detection value of the RV sensor 11B is amplified by a differential amplifier (not illustrated), and thus the amount of vibration of the disk DK1 in a substantially circumferential direction can be detected. The RV sensors 11A and 11B supply detection results of the amount of vibration to the controller 5.

The shock sensor 12 can detect the amount of vibration in each of the X, Y, and Z directions. The amount of vibration detected by the shock sensor 12 is a displacement amount, velocity, acceleration, or any other physical quantity. The shock sensor 12 is fixed to the base 1a of the housing 1, and can detect the amount of vibration in the X direction, the Y direction, and the Z direction of the housing 1.

The write prohibition detector 13 receives a detection result from the shock sensor 12. The write prohibition detector 13 detects write prohibition when the amount of vibration detected by the shock sensor 12 exceeds a predetermined threshold. The write prohibition detector 13 does not detect the write prohibition when the amount of vibration detected by the shock sensor 12 is within a predetermined threshold.

The controller 5 is communicably connected to a host system HS, and upon receiving a command from the host system HS, the controller 5 can perform control according to the command.

The controller 5 includes a head amplifier 6, a driver 7, a read/write (R/W) channel 8, a hard disk control unit (HDC) 9, a volatile memory 14, a buffer memory 15, and a nonvolatile memory 16.

The controller 5 performs overall control of the disk device 100 according to firmware stored in advance in the nonvolatile memory 16 or the disk DK1. The firmware is initial firmware and control firmware used for normal operation. The initial firmware executed first at the time of activation is stored in, for example, the nonvolatile memory 16, and the control firmware used for the normal operation is recorded in the disk DK1. Under the control according to the initial firmware, data is temporarily read from the disk DK1 to the buffer memory 15 and then stored in the volatile memory 14.

The head amplifier 6 selects the heads H0 and H1 and amplifies a signal at the time of writing or detects a signal at the time of reading. The head amplifier 6 includes a write current control unit 6A, a read signal detection unit 6B, and a head selection unit 6C. The head selection unit 6C selects a head H to be used from the heads H0 and H1. The controller 5 controls and positions the position of the head H with respect to the disk DK1 on the basis of the servo information read by the selected head H. The write current control unit 6A controls a write current flowing through the write head in the head H in a state where the head H is positioned. The read signal detection unit 6B detects a signal read by the read head in the head H in a state where the head H is positioned. The head amplifier 6 can be implemented as an integrated circuit (IC).

The driver 7 drives the voice coil motor 4 and the spindle motor 3, and captures rotational vibration (RV) signals from the RV sensors 11A and 11B. The driver 7 includes a spindle motor (SPM) control unit 7A, a voice coil motor (VCM) control unit 7B, and an RV signal capturing unit 7D. The spindle motor control unit 7A controls rotation of the spindle motor 3. The voice coil motor control unit 7B controls driving of the voice coil motor 4. The RV signal capturing unit 7D captures rotational vibration signals (RV signals) from the RV sensors 11A and 11B.

Note that, in a case where the actuator AC1 further includes the microactuators MA0 and MA1, the driver 7 further includes a microactuator (MA) control unit 7C. The microactuator (MA) control unit 7C controls driving of the microactuators MA0 and MA1. Thus, the position of the head H can be finely adjusted.

The read/write channel 8 exchanges data between the head amplifier 6 and the hard disk control unit 9. Note that the data includes read data, write data, and the servo information. The read/write channel 8 includes a write prohibition unit 8A. The write prohibition unit 8A includes a sensor write prohibition unit 8A1 and an HDC write prohibition unit 8A2.

The sensor write prohibition unit 8A1 receives a detection result of the write prohibition detector 13. When the write prohibition has been detected, the sensor write prohibition unit 8A1 supplies a write prohibition instruction to the head amplifier 6. When the write prohibition has not been detected, the sensor write prohibition unit 8A1 supplies a write permission instruction to the head amplifier 6.

The HDC write prohibition unit 8A2 receives a determination result of the write prohibition determination from the hard disk control unit 9. When the determination result is write prohibition, the HDC write prohibition unit 8A2 supplies the write prohibition instruction to the head amplifier 6. When the determination result is write permission, the HDC write prohibition unit 8A2 supplies the write permission instruction to the head amplifier 6.

Upon receiving the write prohibition instruction from at least one of the sensor write prohibition unit 8A1 or the HDC write prohibition unit 8A2, the head amplifier 6 prevents the write operation to the disk DK1 by the head H from being performed. That is, the write current control unit 6A prevents the write current from flowing through the write head in the head H.

Upon receiving the write permission instruction from both the sensor write prohibition unit 8A1 and the HDC write prohibition unit 8A2, the head amplifier 6 causes the head H to perform the write operation to the disk DK1. That is, the write current control unit 6A controls the write current flowing through the write head in the head H in a state where the head H is positioned.

The hard disk control unit 9 performs write control and read control on the basis of a write command and a read command from the outside of the disk device 100 (for example, host system HS), and exchanges data between the outside and the read/write channel 8. The configuration including the driver 7, the read/write channel 8, and the hard disk control unit 9 can be implemented as a system-on-chip.

The hard disk control unit 9 includes a command control unit 9A and a servo control unit 6B. The command control unit 9A controls an operation according to a command received from the host system HS. The command control unit 9A includes a command selection unit 9A1. When the hard disk control unit 9 receives a command from the host system HS, the command selection unit 9A1 recognizes the received command and selects a control operation according to the recognized command. The command selection unit 9A1 specifies an address or the like included in the command.

In a case where the command is a write command, the command selection unit 9A1 selects write control according to the write command. The command selection unit 9A1 specifies each of a write address and write data included in the write command.

The servo control unit 9B controls the position of the head H according to the control operation selected by the command selection unit 9A1. A tracking control unit 9B1, a seek control unit 9B2, and a write operation determination unit 9B3 are included.

The seek control unit 9B2 controls the seek of the head H to the target track TR on the disk DK1 according to the address (for example, the write address) included in the command. The seek control unit 9B2 controls the actuator AC1 via the read/write channel 8 and the head amplifier 6, causes the head H to seek in the horizontal direction on the trajectory T via the actuator arm AM, and positions the head H to the target track TR. The target track TR is a track TR corresponding to the address (for example, the write address) included in the command.

The tracking control unit 9B1 controls tracking of the head H on the target track TR of the disk DK1. The tracking control unit 9B1 controls the actuator AC1 via the read/write channel 8 and the head amplifier 6, and causes the head H to track on the target track TR via the actuator arm AM.

Here, the hard disk control unit 9 has a function of performing write prohibition determination in a case where the command is a write command. In a state where the head H is positioned and caused to track on the target track according to the write address, the write operation determination unit 9B3 performs the write prohibition determination. There are several types of write prohibition determination, and the types include a write prohibition determination based on a current position and a write prohibition determination based on a predicted position. The write operation determination unit 9B3 includes a position operation determination unit 9B31 and a predicted position operation determination unit 9B32. The position operation determination unit 9B31 performs the write prohibition determination based on the current position, and the predicted position operation determination unit 9B32 performs the write prohibition determination based on the predicted position.

The servo control unit 9B demodulates a position error signal according to the servo information read from the servo region via the head H. The position error signal indicates a relative position of the head H from the center of the track TR. The servo control unit 9B obtains a current actual position of the head H and a velocity component immediately before reaching the current actual position according to the position error signal. The servo control unit 9B may obtain the current actual position of the head H as an absolute value of a current displacement from the center of the track TR of the head H. The servo control unit 9B estimates a future predicted position according to the current actual position of the head H and the velocity component immediately before reaching the current actual position. The servo control unit 9B may obtain the future predicted position of the head H as an absolute value of a future displacement from the center of the track TR of the head H.

The predicted position operation determination unit 9B32 performs the write prohibition determination in accordance with the predicted position. The predicted position operation determination unit 9B32 determines that writing is possible when the estimated predicted position is equal to or less than a threshold, and determines that writing is not possible when the estimated predicted position has exceeded the threshold. The servo control unit 9B performs the write operation on the disk DK1 by the head H if the predicted position operation determination unit 9B32 determines that writing is possible, and does not perform the write operation on the disk DK1 by the head H if the predicted position operation determination unit 9B32 determines that writing is not possible. In order to prevent shifted writing in which data is written out of the target track TR, it is desirable that an estimated value of the predicted position used for the write prohibition determination is accurate.

For example, it is assumed that the servo control unit 9B causes the head H to track on the target track TR. The actual position measured with the servo information read by the head H is represented by p, and the predicted position predicted by the servo control unit 9B is represented by $\hat{p}$. Each of the actual position p and the predicted position $\hat{p}$ indicates an absolute value of a position error from a radial center position of the target track TR. The servo control unit 9B acquires (samples) servo information at each predetermined sample interval, and obtains the current actual position of the head H and the velocity component immediately before reaching the current actual position. The simplest implementation of the predicted position $\hat{p}$ is by linear interpolation and is represented by the following Mathematical Expression 1.

$$\hat{p}(k+1) = p(k) + (p(k) - p(k-1)) = 2p(k) - p(k-1) \qquad \text{Mathematical Expression 1}$$

In Mathematical Expression 1, k represents a current sample timing, k−1 represents a past sample timing before one sample interval, and k+1 represents a future sample timing after one sample interval. As represented in Mathematical Expression 1, a predicted position p^(k+1) at one sample interval future is obtained by performing linear interpolation for the current position p(k) with a displacement (p(k)−p(k−1)) from the past.

The purpose of performing the write prohibition determination by the predicted position is to reduce the possibility that the head H protrudes from the target track TR (overrun) and erodes and rewrites the data of the adjacent track TR when positioning of the head H is controlled to the target track TR.

The position error signal indicating the position of the head H can be obtained only in discrete time (sample interval), and there is a time delay between the position demodulation processing and the write prohibition determination. Thus, in a case where the write prohibition determination is made based on the current actual position, even if it is determined that writing is possible with a certain threshold, there is a possibility that writing is actually performed beyond the threshold. In order not to delete the data of the adjacent track, it is necessary to suppress the protrusion amount to a certain value or less, and thus, not only the write prohibition determination based on the current actual position but also the write prohibition determination based on the future predicted position are used.

Here, (p(k)−p(k−1)) represents a velocity component due to displacement from one sample interval before to the present, but velocity estimation due to displacement has a large error. Thus, in the write prohibition determination based on the predicted position of Mathematical Expression 1, a different threshold $T_{h2}$ is used with respect to a threshold $T_{h1}$ used in the write prohibition determination based on the current actual position. The determination condition at this time is represented by the following Mathematical Expression 2.

$$p^\wedge(k+1)=2p(k)-p(k-1)>T_{h1} \quad \text{Mathematical Expression 2}$$

In Mathematical Expression 2, if $T_{h2}=a_1 \times T_{h1}$, Mathematical Expression 2 can be rewritten into the following Mathematical Expression 3.

$$p^\wedge(k+1)/a_1=(2/a_1) \times p(k)+(-1/a_1) \times p(k-1)>T_{h1} \quad \text{Mathematical Expression 3}$$

When the generalized coefficients a and b are introduced in Mathematical Expression 3, Mathematical Expression 3 can be rewritten into the following Mathematical Expression 4.

$$p^\wedge(k+1)/a_1=a \times p(k)+b \times p(k-1)>T_{h1} \quad \text{Mathematical Expression 4}$$

The coefficients a and b in Mathematical Expression 4 can be made appropriate (for example, optimized) on the basis of time history data of the actual position and the like. In a case where the coefficients a and b are made appropriate for a certain vibration state, it is assumed that the predicted position estimated by the coefficients a and b and the actual position have a good correlation. In this case, if the same coefficients a and b are used in different vibration states, the prediction accuracy may deteriorate. This is considered to be because appropriate values (for example, optimum values) of the coefficients a and b change depending on the frequency component of vibration.

Figure 4A:
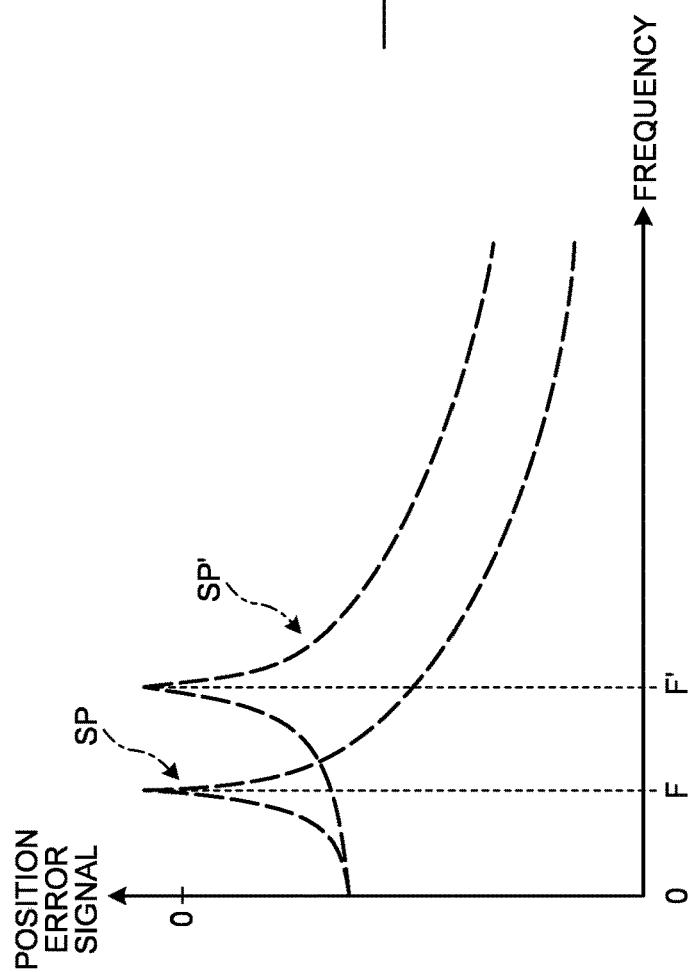
FIGS. 4A and 4B are diagrams illustrating a change in correlation between an actual position and a predicted position according to vibration in the first embodiment.
Figure 4B:
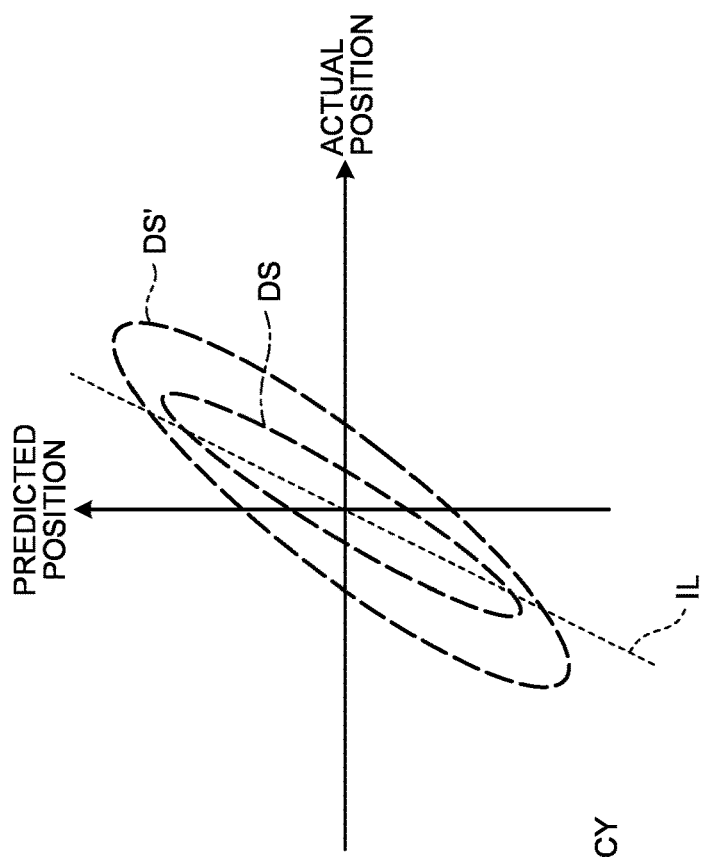

For example, it is assumed that the actuator AC1 receives vibration including a peak frequency component at the frequency F (for example, 5 kHz). At this time, the position error signal indicates a frequency spectrum SP indicated by a one-dot chain line in FIG. 4A. FIGS. 4A and 4B are diagrams illustrating changes in correlation between the actual position and the predicted position according to vibration. The frequency spectrum SP has a peak at the frequency F. In this state, when the servo control unit 9B estimates the predicted position by making the coefficients a and b appropriate, the predicted position estimated by the coefficients a and b and the actual position are distributed as DS indicated by a one-dot chain line in FIG. 4B. The distribution DS is generally a distribution along an ideal correlation straight line IL indicated by a dotted line in FIG. 4B, and indicates that the predicted position estimated by the coefficients a and b has a good correlation with the actual positions.

At this time, it is assumed that the vibration received by the actuator AC1 is changed to vibration including a peak frequency component in the frequency F' (for example, 10 kHz). At this time, the position error signal indicates a frequency spectrum SP' indicated by a two-dot chain line in FIG. 4A. The frequency spectrum SP' has a peak at the frequency F'. In this state, when the servo control unit 9B estimates the predicted position using the same coefficients a and b as described above, the predicted position estimated by the coefficients a and b and the actual position are distributed as DS' indicated by a two-dot chain line in FIG. 4B. The distribution DS' is a distribution deviating from the ideal correlation straight line IL indicated by a dotted line in FIG. 4B, and indicates that the correlation between the predicted position estimated by the coefficients a and b and the actual position has deteriorated.

On the other hand, the hard disk control unit 9 further includes a predicted position coefficient updating unit 9B4. The predicted position coefficient updating unit 9B4 acquires information regarding the state of the vibration source. The predicted position coefficient updating unit 9B4 may acquire the detection results of the RV sensors 11A and 11B as information regarding the state of the vibration source, or may acquire the position error signal generated by the servo control unit 9B as information regarding the state of the vibration source. The predicted position coefficient updating unit 9B4 changes the values of the coefficients a and b for estimating the predicted position of the head H according to the information regarding the state of the vibration source. The predicted position coefficient updating unit 9B4 may estimate the frequency of vibration of the vibration source according to the detection results of the RV sensors 11A and 11B, or may estimate the frequency of vibration of the vibration source according to the position error signal. The predicted position coefficient updating unit 9B4 may change the values of the coefficients a and b according to the estimated frequency.

In addition, in a case where the actuator AC1 receives vibration from a certain vibration source, the plural heads H0 and H1 moved by the actuator AC1 are different from each other in how the vibration is transmitted. Even if the frequency of vibration is the same, an appropriate value (for example, an optimum value) of the coefficient may be different for each of the heads H0 and H1. Thus, the predicted position coefficient updating unit 9B4 may change the values of the coefficients a and b for each of the heads H0 and H1 according to the estimated frequency.

For example, coefficient information as illustrated in FIGS. 5A and 5B may be stored in the nonvolatile memory 16 or the disk DK1. FIGS. 5A and 5B are diagrams illustrating a data structure of coefficient information. FIG. 5A illustrates a frequency level definition table as part of the coefficient information, and FIG. 5B illustrates a predicted position coefficient table as another part of the coefficient information. In FIG. 5B, the coefficients are indicated by a (head identifier, frequency level) and b (head identifier, frequency level).

In the frequency level definition table illustrated in FIG. 5A, a frequency range and a frequency level are associated for plural frequency ranges. For example, a range of frequencies F0 to F1 is defined as a frequency level "0". A range of frequencies F1 to F2 is defined as a frequency level "1". A range of frequencies FM to F(M+1) is defined as a frequency level "M". M is an arbitrary integer of 2 or more.

In the predicted position coefficient table illustrated in FIG. 5B, a head identifier (for example, a head number), a frequency level, and a predicted position coefficient are associated with each head for plural frequency levels. For the head H0 of the head identifier "0", coefficients a (0, 0) and b (0, 0) correspond to the frequency level "0", and coefficients a (0, M) and b (0, M) correspond to the frequency level "M". For the head H1 of the head identifier "1", coefficients a (1, 0) and b (1, 0) correspond to the frequency level "0", and coefficients a (1, M) and b (1, M) correspond to the frequency level "M".

The predicted position coefficient updating unit 9B4 can update the values of the coefficients a and b for each of the heads H0 and H1 by using the frequency level definition table illustrated in FIG. 5A and the predicted position coefficient table illustrated in FIG. 5B according to the estimated frequency.

Note that the coefficient information for changing the values of the coefficients a and b may be mounted on the disk device 100 in the form of a mathematical expression instead of the form of the table illustrated in FIGS. 5A and 5B. For example, information of expressions such as the following Mathematical Expressions 5 and 6 may be stored in the nonvolatile memory 16 or the disk DK1 and referred to by the predicted position coefficient updating unit 9B4. $f_a$ includes an arbitrary mathematical expression in which the coefficient a is represented by a function of a peak frequency of vibration as a variable. $f_b$ includes an arbitrary mathematical expression in which the coefficient b is represented by a function of a peak frequency of vibration as a variable.

$a$(head identifier,frequency level)=$f_a$(peak frequency of vibration)   Mathematical Expression 5

$b$(head identifier,frequency level)=$f_b$(peak frequency of vibration)   Mathematical Expression 6

Next, an operation of the disk device 100 will be described with reference to FIG. 6. FIG. 6 is a flowchart illustrating an operation in tracking of the disk device 100. The disk device 100 can perform the operation illustrated in FIG. 6 as interrupt processing for each sample timing in a state where the head H is made to track on the target track TR.

The controller 5 calculates the actual position of the head H by servo demodulation in a state where the head H is made to track on the target track TR (S1). The controller 5 reads the servo information from the servo region SR via the read head of the head H. The controller 5 demodulates the position error signal according to the servo information. The position error signal indicates the relative position of the head H from the center of the track TR. The controller 5 obtains the current actual position of the head H according to the position error signal.

The controller 5 determines whether or not the actual position p(k) of the head H has exceeded the threshold $T_{h1}$ (S2). If the actual position p(k) of the head H has exceeded the threshold $T_{h1}$ (YES in S2), the controller 5 determines that write is prohibited (S11) and does not perform the write operation.

If the actual position p(k) of the head H is equal to or less than the threshold $T_{h1}$ (NO in S2), the controller 5 determines that there is a possibility of permission for writing and acquires detection results of the sensors such as the RV sensors 11A and 11B (S3). The controller 5 estimates the vibration state of the vibration source according to the detection results of the sensors (S4). The controller 5 may estimate an amplitude and a direction of vibration as the state of the vibration source. The controller 5 determines a vibration control instruction value so as to suppress vibration according to the estimated vibration state (S5), and performs control according to the vibration control instruction value (S6). As the control, the controller 5 may perform vibration control of vibrating the actuator AC1 so as to cancel the influence of vibration.

Figure 7:
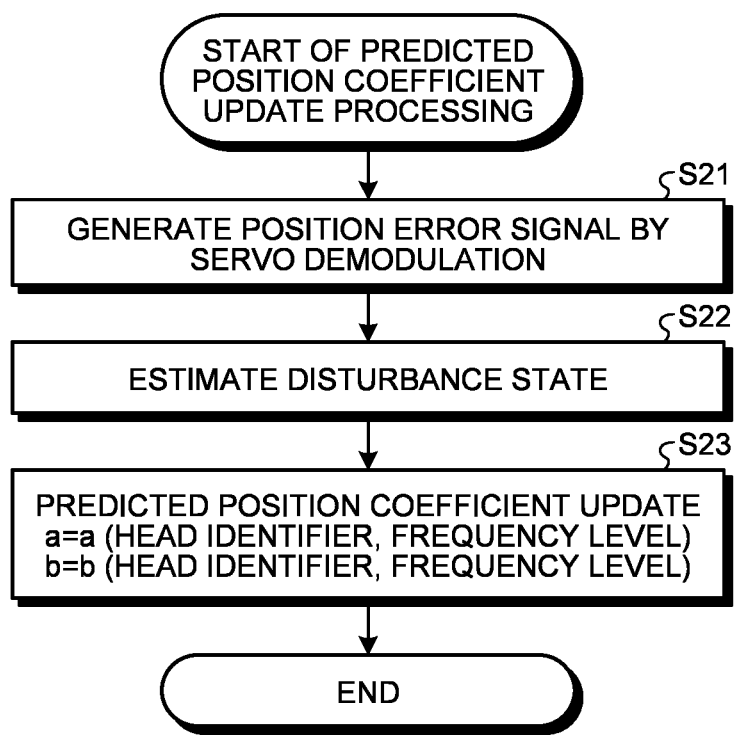
FIG. 7 is a flowchart illustrating predicted position coefficient update processing in the first embodiment.

The controller 5 performs a predicted position coefficient update processing (S7). The controller 5 may perform processes of S21 to S23 illustrated in FIG. 7 as the predicted position coefficient update processing. FIG. 7 is a flowchart illustrating the predicted position coefficient update processing.

The controller 5 generates a position error signal by the servo demodulation in a state where the control of S6 is performed (S21). The controller 5 estimates a disturbance state of the actuator AC1 according to the position error signal (S22). The disturbance state includes a state of vibration due to disturbance (for example, vibration by a fan, and the like) that cannot be suppressed by control such as vibration control. The controller 5 may estimate the frequency of vibration due to disturbance as the disturbance state.

The controller 5 updates the values of the coefficients a and b for obtaining the predicted position according to the estimated disturbance state (S23). The controller 5 may update the values of the coefficients a and b with reference to coefficient information as illustrated in FIGS. 5A and 5B according to the frequency of vibration due to disturbance.

For example, when the frequency F (see FIG. 4A) of vibration due to disturbance is within the range of frequencies F0 to F1, the predicted position coefficient updating unit 9B4 refers to the frequency level definition table illustrated in FIG. 5A and specifies the frequency level as "0". The predicted position coefficient updating unit 9B4 refers to the predicted position coefficient table illustrated in FIG. 5B, updates the coefficients of the head H0 to a (0, 0) and b (0, 0) corresponding to the frequency level "0", and updates the coefficients of the head H1 to a (1, 0) and b (1, 0) corresponding to the frequency level "0".

Alternatively, when the frequency F' (see FIG. 4A) of the vibration due to the disturbance is within the range of the frequencies F1 to F2, the predicted position coefficient updating unit 9B4 refers to the frequency level definition table illustrated in FIG. 5A and specifies the frequency level as "1". The predicted position coefficient updating unit 9B4 refers to the predicted position coefficient table illustrated in FIG. 5B, updates the coefficients of the head H0 to a (0, 1) and b (0, 1) corresponding to the frequency level "1", and updates the coefficients of the head H1 to a (1, 1) and b (1, 1) corresponding to the frequency level "1".

When the values of the coefficients a and b are updated, as illustrated in FIG. 6, the controller 5 estimates the predicted position of the head H using the coefficients a and b after the update (S8). The controller 5 may estimate a parameter p^(k+1)/a₁ corresponding to the predicted position of the head H by Mathematical Expression 4 using the coefficients a and b after the update.

For example, in a case where the write operation is to be performed in the head H0 according to the write address included in the write command, if the coefficients of the head H0 are updated to a (0, 0) and b (0, 0) in S6, then a (0, 0) and b (0, 0) may be substituted into Mathematical Expression 4 to estimate the parameter p^(k+1)/a₁.

The controller 5 determines whether or not the predicted position p^(k+1) of the head H has exceeded the threshold $T_{h2}$ (S9). The controller 5 may determine whether or not the inequality of Mathematical Expression 4 is satisfied using the coefficients a and b after the update. The controller 5 can determine that the predicted position p^(k+1) of the head H has exceeded the threshold $T_{h2}$ if the inequality of Mathematical Expression 4 is satisfied using the coefficients a and b after the update. The controller 5 can determine that the predicted position p^(k+1) of the head H is equal to or less than the threshold $T_{h2}$ if the inequality of Mathematical Expression 4 is not satisfied using the coefficients a and b after the update.

If the predicted position p^(k+1) of the head H has exceeded the threshold $T_{h2}$ (YES in S9), the controller 5 determines that write is prohibited (S11) and does not perform the write operation by the head H.

When the predicted position p^(k+1) of the head H is equal to or less than the threshold $T_{h}z$ (NO in S9), the controller 5 determines that the write is permitted (S10) and performs the write operation by the head H. The controller 5 applies a write current to the write head of the head H, and writes write data in the data region DR of the target track TR.

As described above, in the first embodiment, in the disk device 100, the controller 5 acquires the information regarding the state of the vibration source, changes the values of the coefficients for estimating the predicted position of the head H according to the information regarding the state of the vibration source, and estimates the predicted position of the head H with the changed values of the coefficients. In this manner, the estimation accuracy of the predicted position can be improved, and thus the accuracy of the write prohibition determination based on the predicted position can be improved. Consequently, it is possible to secure a period during which the head H can properly perform the write operation in the target track TR while preventing shifted writing in which the head H protrudes from the target track TR to the adjacent track TR and overwrites thereon. That is, in a case where vibration is generated, both improvement in reliability and improvement in performance of the write operation can be achieved, and the write operation can be appropriately performed.

Note that in the operation illustrated in FIG. 6, the processing of S3 may be omitted. In this case, the controller 5 may estimate the vibration state in S4 using the position error signal generated in S1 as information regarding the state of the vibration source.

Second Embodiment

Next, a disk device 200 according to a second embodiment will be described. Hereinafter, portions different from those of the first embodiment will be mainly described.

In the first embodiment, a configuration and an operation in a case where the disk device 100 includes one actuator are exemplified, and in the second embodiment, a configuration (multi-actuator configuration) and an operation in a case where the disk device 200 includes plural actuators are exemplified.

Figure 8:
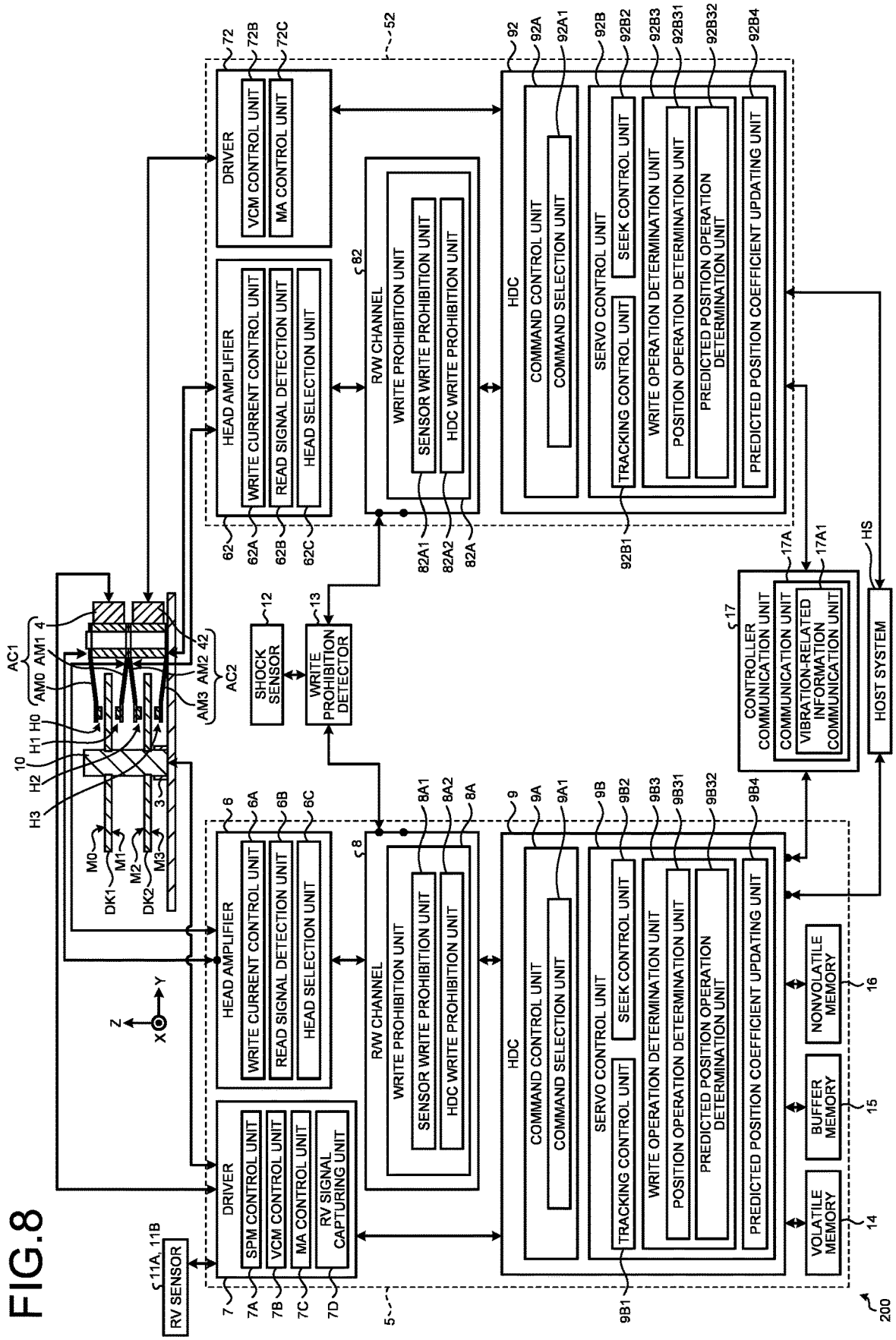
FIG. 8 is a diagram illustrating a configuration of a disk device according to a second embodiment.

The disk device 200 can be configured as illustrated in FIG. 8. FIG. 8 is a diagram illustrating a configuration of the disk device 200, in which a part of the configuration of the disk device 200 is illustrated in a cross-sectional view and the other part is illustrated in a block diagram.

The disk device 200 further includes a disk DK2, a head H2, a head H3, an actuator AC2, a controller communication unit 17, and a controller 52. The controller 5 corresponds to the actuator AC1, and the controller 52 corresponds to the actuator AC2. Thus, the actuator AC1 and the actuator AC2 can be controlled independently of each other.

The disk DK2 is a substantially disk-shaped medium similar to the disk DK1 (see FIG. 2), and is supported rotatably around the Z axis by the base of the housing 1 via the spindle 10 together with the disk DK1. The disk DK2 is disposed between the disk DK1 and the base 1a in the Z direction. The disk DK2 has a recording surface M2 on the +Z side and a recording surface M3 on the −Z side.

The head H2 is held by the actuator AC2 and disposed so as to face the recording surface M2 of the disk DK2. The head H3 is held by the actuator AC2 and disposed so as to face the recording surface M3 of the disk DK2. Each of the heads H2 and H3 includes a write head and a read head. The actuator AC2 moves the heads H2 and H3 with respect to the recording surfaces M2 and M3 at the time of seek or the like, and positions the heads H2 and H3 to one of the plural tracks TR.

The plural actuators AC1 and AC2 are configured to be drivable independently of each other. The actuator AC2 includes a voice coil motor (VCM) 42 and actuator arms AM2 and AM3. The head H2 is provided at a position on the disk DK2 side (recording surface M2 side) at a distal end of the actuator arm AM2. The head H3 is provided at a position on the disk DK2 side (recording surface M3 side) at the distal end of the actuator arm AM2.

Note that the actuator AC2 may further include microactuators MA2 and MA3. In this case, the microactuators MA2 and MA3 are provided at the distal ends of the actuator arms AM2 and AM3. The head H2 is provided at a position on the disk DK2 side (recording surface M2 side) at a distal end of the microactuator MA2. The head H3 is provided at a position on the disk DK2 side (recording surface M3 side) at a distal end of the microactuator MA3.

The actuator AC2 drives the actuator arms AM2 and AM3 with the shaft AX1 (see FIG. 3) as a rotation center by the voice coil motor 42 at the time of seek or the like. In a case where the actuator arms AM2 and AM3 are configured to rotate simultaneously, the actuator AC2 may move and position the heads H2 and H3 simultaneously.

For example, the actuator AC2 causes the heads H2 and H3 to seek in the horizontal direction on the trajectory T via the actuator arms AM2 and AM3, and positions the heads H2 and H3 to the target track TR. The actuator AC2 causes the heads H2 and H3 to track on the target track TR.

The controller communication unit 17 mediates communication between the controller 5 and the controller 52. The controller communication unit 17 includes a communication unit 17A. The communication unit 17A includes a vibration-related information communication unit 17A1.

Upon receiving a notification request for the vibration-related information from the controller 5, the communication unit 17A transfers the notification request to the controller 52. The controller 52 may hold the vibration-related information or may generate the vibration-related information in response to the notification request. Upon receiving the notification request, the controller 52 supplies the vibration-related information to the vibration-related information communication unit 17A1 as a response. The vibration-related information communication unit 17A1 transfers the vibration-related information to the controller 5.

Upon receiving the notification request for the vibration-related information from the controller 52, the communication unit 17A transfers the notification request to the controller 5. The controller 5 may hold the vibration-related information or may generate the vibration-related information in response to the notification request. Upon receiving the notification request, the controller 5 supplies the vibration-related information to the vibration-related information communication unit 17A1 as a response. The vibration-related information communication unit 17A1 transfers the vibration-related information to the controller 52.

The controller 52 is communicably connected to the host system HS, and can perform control according to a command upon receiving the command from the host system HS.

The controller 52 includes a head amplifier 62, a driver 72, a read/write (R/W) channel 82, and a hard disk control unit (HDC) 92.

The head amplifier 62 selects the heads H2 and H3 and amplifies a signal at the time of writing or detects a signal at the time of reading. The head amplifier 62 includes a write current control unit 62A, a read signal detection unit 62B, and a head selection unit 62C. The head selection unit 62C selects the head H to be used from the heads H2 and H3. The controller 5 controls and positions the position of the head H with respect to the disk DK2 on the basis of the servo information read by the selected head H. The write current control unit 62A controls the write current flowing through the write head in the head H in a state where the head H is positioned. The read signal detection unit 62B detects a signal read by the read head in the head H in a state where the head H is positioned. The head amplifier 62 can be implemented as an integrated circuit (IC).

The driver 72 drives the voice coil motor 42 and the spindle motor 3, and takes in a rotational vibration (RV) signal from the RV sensors 11A and 11B. The driver 72 includes a spindle motor (SPM) control unit 72A, a voice coil motor (VCM) control unit 72B, and an RV signal capturing unit 72D. The spindle motor control unit 72A controls rotation of the spindle motor 3. The voice coil motor control unit 72B controls driving of the voice coil motor 42. The RV signal capturing unit 72D captures rotational vibration signals (RV signals) from the RV sensors 11A and 11B.

Note that, in a case where the actuator AC2 further includes the microactuators MA2 and MA3, the driver 72 further includes a microactuator (MA) control unit 7C. The microactuator (MA) control unit 7C controls driving of the microactuators MA2 and MA3. Thus, the position of the head H can be finely adjusted.

The read/write channel 82 exchanges data between the head amplifier 62 and the hard disk control unit 92. Note that the data includes read data, write data, and the servo information. The read/write channel 82 includes a write prohibition unit 82A. The write prohibition unit 82A includes a sensor write prohibition unit 82A1 and an HDC write prohibition unit 82A2.

The sensor write prohibition unit 82A1 receives a detection result of the write prohibition detector 13. If the write prohibition has been detected, the sensor write prohibition unit 82A1 supplies the write prohibition instruction to the head amplifier 62. If the write prohibition has not been detected, the sensor write prohibition unit 82A1 supplies the write permission instruction to the head amplifier 62.

The HDC write prohibition unit 82A2 receives the determination result of the write prohibition determination from the hard disk control unit 92. If the determination result is write prohibition, the HDC write prohibition unit 82A2 supplies the write prohibition instruction to the head amplifier 62. If the determination result is write permission, the HDC write prohibition unit 82A2 supplies the write permission instruction to the head amplifier 62.

When receiving the write prohibition instruction from at least one of the sensor write prohibition unit 82A1 or the HDC write prohibition unit 82A2, the head amplifier 62 prevents the write operation to the disk DK2 by the head H from being performed. That is, the write current control unit 62A prevents the write current from flowing through the write head in the head H.

When the head amplifier 62 receives the write permission instruction from both the sensor write prohibition unit 82A1 and the HDC write prohibition unit 82A2, the write operation to the disk DK2 by the head H is performed. That is, the write current control unit 62A controls the write current flowing through the write head in the head H in a state where the head H is positioned.

The hard disk control unit 92 performs write control and read control on the basis of a write command and a read command from the outside of the disk device 100 (for example, host system HS), and exchanges data between the outside and the read/write channel 82. The configuration including the driver 72, the read/write channel 82, and the hard disk control unit 92 can be implemented as a system-on-chip.

The hard disk control unit 92 includes a command control unit 92A and a servo control unit 92B. The command control unit 922A controls an operation according to a command received from the host system HS. The command control unit 92A includes a command selection unit 92A1. When the hard disk control unit 92 receives a command from the host system HS, the command selection unit 92A1 recognizes the received command and selects the control operation according to the recognized command. The command selection unit 92A1 specifies an address or the like included in the command.

In a case where the command is a write command, the command selection unit 92A1 selects write control according to the write command. The command selection unit 92A1 specifies each of the write address and ride data included in the write command.

The servo control unit 92B controls the position of the head H according to the control operation selected by the command selection unit 92A1. A tracking control unit 92B1, a seek control unit 92B2, and a write operation determination unit 92B3 are included.

The seek control unit 92B2 controls the seek operation of the head H to the target track TR on the disk DK2 according to the address (for example, the write address) included in the command. The seek control unit 92B2 controls the actuator AC2 via the read/write channel 82 and the head amplifier 62, causes the head H to seek in the horizontal direction on the trajectory T via the actuator arm AM, and positions the head H to the target track TR. The target track is the track TR corresponding to the address (for example, the write address) included in the command.

The tracking control unit 92B1 controls tracking operation of the head H on the target track TR of the disk DK2. The tracking control unit 92B1 controls the actuator AC2 via the read/write channel 82 and the head amplifier 62, and causes the head H to track on the target track TR via the actuator arm AM.

Here, the hard disk control unit 92 has a function of performing write prohibition determination in a case where the command is a write command. In a state where the head H is positioned and caused to track on the target track TR according to the write address, the write operation determination unit 92B3 performs the write prohibition determination. There are several types of write prohibition determination, and the types include a write prohibition determination based on a current position and a write prohibition determination based on a predicted position. The write operation determination unit 92B3 includes a position operation determination unit 92B31 and a predicted position operation determination unit 92B32. The position operation determination unit 92B31 performs the write prohibition determination based on the current position, and the predicted position operation determination unit 92B32 performs the write prohibition determination based on the predicted position.

The servo control unit 92B demodulates the position error signal according to the servo information read from the servo region via the head H. The position error signal indicates a relative position of the head H from the center of the track TR. The servo control unit 92B obtains a current actual position of the head H and a velocity component immediately before reaching the current actual position according to the position error signal. The servo control unit 92B may obtain the current actual position of the head H as an absolute value of a current displacement from the center of the track TR of the head H. The servo control unit 92B estimates a future predicted position according to the current actual position of the head H and the velocity component immediately before reaching the current actual position. The servo control unit 92B may obtain the future predicted position of the head H as an absolute value of a future displacement from the center of the track TR of the head H.

The predicted position operation determination unit 92B32 performs the write prohibition determination according to the predicted position. The predicted position operation determination unit 92B32 determines that writing is possible when the estimated predicted position is equal to or less than a threshold, and determines that writing is not possible when the estimated predicted position has exceeded the threshold. The servo control unit 92B performs the write operation on the disk DK2 by the head H if the predicted position operation determination unit 92B32 determines that writing is possible, and does not perform the write operation on the disk DK2 by the head H if the predicted position operation determination unit 92B32 determines that writing is not possible. In order to prevent the shifted writing in which data is written out of the target track TR, it is desirable that the estimated value of the predicted position used for the write prohibition determination is accurate.

For example, it is assumed that the servo control unit 92B causes the head H to track on the target track TR. Assuming that the actual position measured with the servo information read by the head H is represented by p and the predicted position predicted by the servo control unit 9B is represented by p^, the write prohibition determination based on the predicted position can be performed depending on whether or not the inequality of Mathematical Expression 3 or Mathematical Expression 4 is satisfied.

The point that the appropriate values (for example, optimum values) of the coefficients a and b used for estimating the predicted position can fluctuate due to the influence of the vibration received by the actuators AC1 and AC2 is similar to the first embodiment, but in a case of the multi-actuator configuration, the influence of the operation state of another actuator is larger than the disturbance. Although the actuators AC1 and AC2 affect each other, here, the actuator AC executing the affected write operation is referred to as a victim, and the affecting actuator AC is referred to as an aggressor.

In a case where the aggressor performs a seek operation, the manner of influence varies depending on the shape of a VCM current flowing through the voice coil motor (VCM). The VCM current at the time of seek is referred to as a seek current. A position error on the victim side at this time is represented by (position error)=(aggressor current)×(cross transfer function)×(victim sensitivity function).

The aggressor current is the VCM current on the aggressor side (seek current at the time of seek). The cross transfer function is a transfer function from the aggressor current to the victim side head. The victim sensitivity function is a function indicating feedback characteristics of the VCM current on the victim side.

Figure 9:
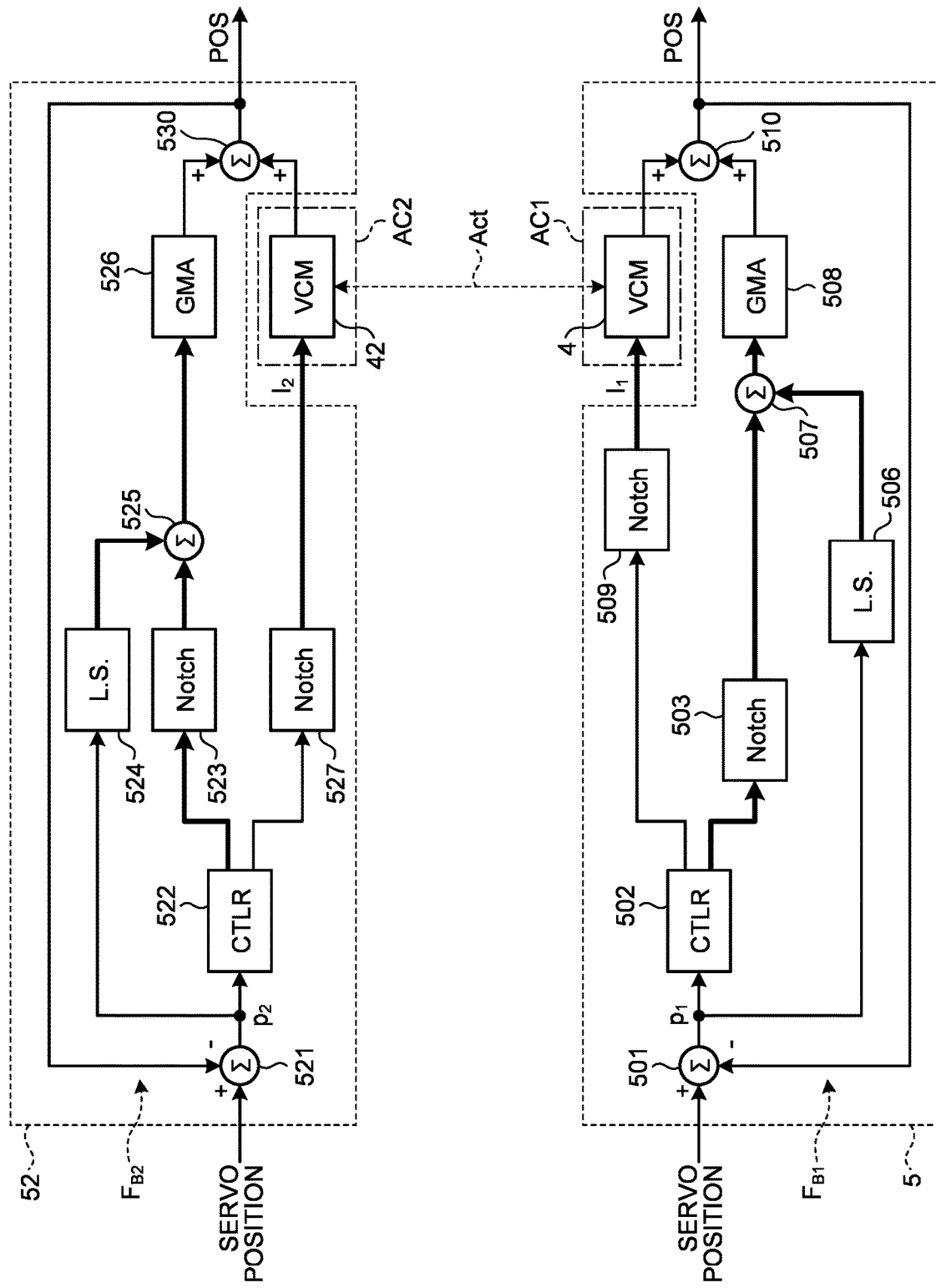
FIG. 9 is a diagram illustrating transmission characteristics of vibration between actuators in the second embodiment.

The controller 52 of the actuator AC2 and the controller 5 of the actuator AC1 are functionally configured as illustrated in FIG. 9. The controller 52 includes a subtractor 521, a CTLR 522, a notch 523, an LS 524, an adder 525, a GMA 526, a notch 527, and an adder 530. The controller 5 includes a subtractor 501, a CTLR 502, a notch 503, an LS 506, an adder 507, a GMA 508, a notch 509, and an adder 510.

A cross transfer function between the voice coil motor 42 of the actuator AC2 and the voice coil motor 4 of the actuator AC1 is represented by $A_{ct}$. In the controller 52, the position error signal generated by subtracting the head position signal POS from the servo position by the subtractor 521 is represented by $p_2$, the current supplied from the notch 527 to the voice coil motor 42 of the actuator AC2 is represented by $I_2$, and the feedback characteristic from the voice coil motor 42 to the subtractor 521 is represented by $F_{B2}$. In the controller 5, the position error signal generated by subtracting the head position signal POS from the servo position by the subtractor 501 is represented by $p_1$, the current supplied from the notch 509 to the voice coil motor 4 of the actuator AC1 is represented by $I_1$, and the feedback characteristic from the voice coil motor 4 to the subtractor 501 is represented by $F_{B1}$.

For example, in a case where the aggressor=actuator AC2 and the victim=actuator AC1, since the aggressor current is $I_2$, the cross transfer function is $A_{ct}$, and the victim sensitivity function is $F_{B1}$, the position error signal $p_1$ of the head H (head H0 or head H1) of the actuator AC1 is represented by the following Mathematical Expression 7.

$$p_1 = I_2 \times A_{ct} \times F_{B1} \qquad \text{Mathematical Expression 7}$$

Alternatively, in a case where the aggressor=actuator AC1 and the victim=actuator AC2, since the aggressor current is $I_1$, the cross transfer function is $A_{ct}$, and the victim sensitivity function is $F_{B2}$, the position error signal $p_2$ of the head H (head H2 or head H3) of the actuator AC2 is represented by the following Mathematical Expression 8.

$$p_2 = I_1 \times A_{ct} \times F_{B2} \qquad \text{Mathematical Expression 8}$$

In the multi-actuator configuration, the frequency of vibration received by the actuator AC on the victim side may fluctuate according to the operation mode. The frequency of the vibration received by the actuator AC on the victim side appears as the frequency of the fluctuation of the position error signal of the head H on the victim side.

For example, in a case where the aggressor side performs a seek operation, the waveform of the aggressor current depends on a seek control method of the seek operation. The seek control method includes a long distance seek and a short distance seek. The long distance seek is a control method in which a moving distance of the head H to seek is relatively long, and the short distance seek is a control method in which a moving distance of the head H to seek is relatively short. A frequency component (that is, the frequency of vibration on the aggressor side) that the seek current has may be greatly different depending on a seek distance.

Figure 10A:
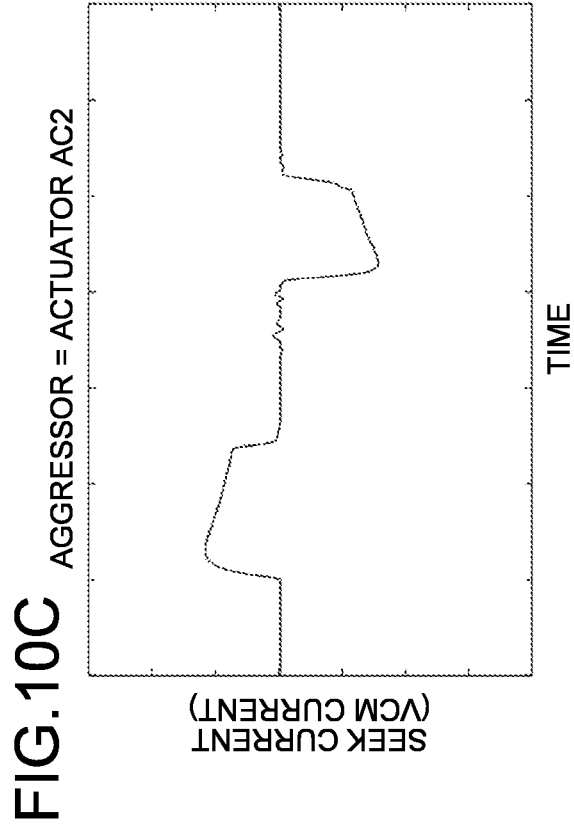
FIGS. 10A to 10D are diagrams illustrating changes in a seek current and a position error signal according to vibration in the second embodiment.

In a case where the aggressor=actuator AC2 and the victim=actuator AC1, and the seek control method of the aggressor is the long distance seek, the seek current on the aggressor side changes with a relatively large amplitude as illustrated in FIG. 10A in response to the relatively long seek distance. In response to this, the position error signal of the head H1 on the victim side fluctuates at a relatively slow frequency as illustrated in FIG. 10B. FIGS. 10A and 10B are diagrams illustrating changes in the seek current and the position error signal, respectively, in a case where the aggressor=actuator AC2 and the victim=actuator AC1, and the seek control method of the aggressor is the long distance seek. The vertical axis in FIG. 10A represents the level of the seek current, the vertical axis in FIG. 10B represents the level of the position error signal, and the horizontal axes in FIGS. 10A and 10B each represent time.

Figure 10C:
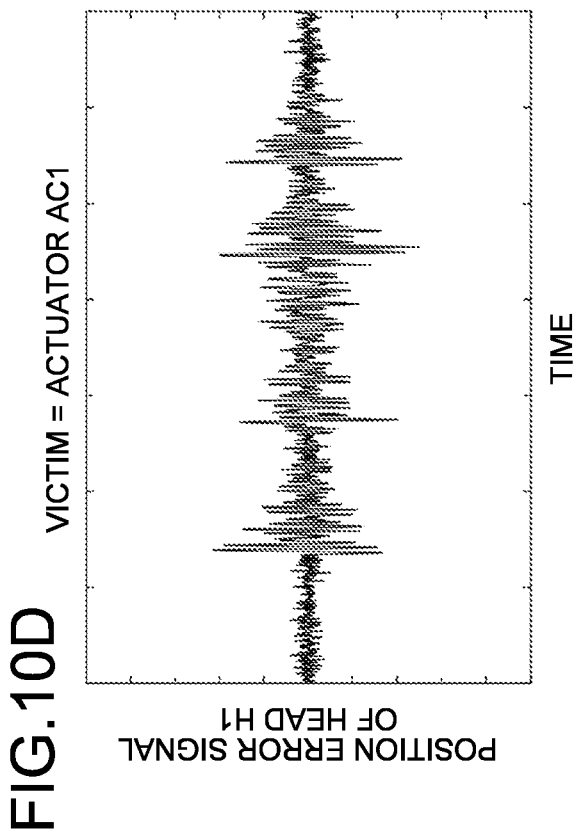
Figure 10B:
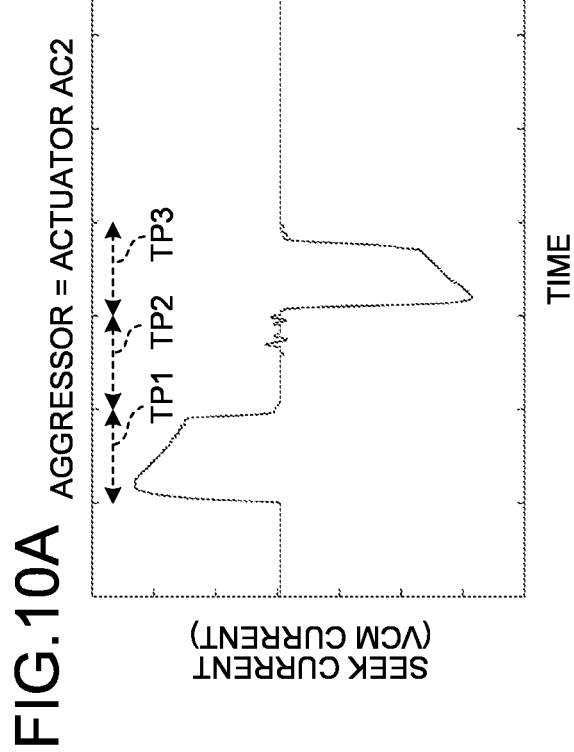
Figure 10D:
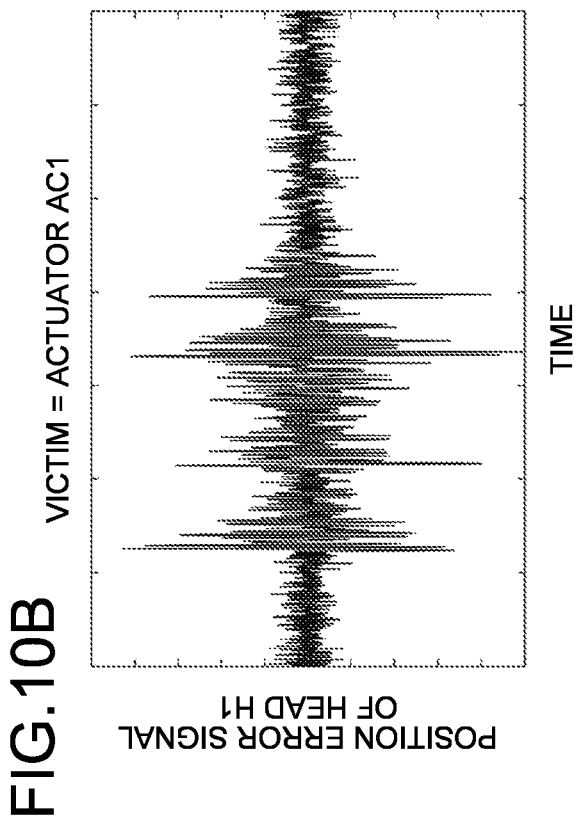

On the other hand, in a case where the aggressor=actuator AC2 and the victim=actuator AC1, and the seek control method of the aggressor is the short distance seek, the seek current on the aggressor side changes with a relatively small amplitude as illustrated in FIG. 10C in response to the relatively short seek distance. In response to this, the position error signal of the head H1 on the victim side fluctuates at a relatively fast frequency as illustrated in FIG. 10D. FIGS. 10C and 10D are diagrams illustrating changes in the seek current and the position error signal, respectively, in a case where the aggressor=actuator AC2 and the victim=actuator AC1, and the seek control method of the aggressor is the short distance seek. The vertical axis in FIG. 10C represents the level of the seek current, the vertical axis in FIG. 10D represents the level of the position error signal, and the horizontal axes in FIGS. 10C and 10D each represent time.

The long distance seek uses velocity feedback control in which the velocity of the head H (first-order differential value of the head position signal POS) follows the target velocity and mode switching control in which a seek mode (acceleration mode, constant velocity mode, and deceleration mode) is switched. The short distance seek uses position feedback control in which the position of the head H (head position signal POS) follows the target position trajectory and feedforward control in which the seek current (VCM current $I_1$ or $I_2$) is generated according to a predetermined characteristic. Mode switching control may be further used in the short distance seek. In the mode switching control, there is a possibility that the frequency component that the seek current has greatly differs at each stage of the seek control. Each stage of the seek control includes a rise of a seek current waveform in the acceleration mode, a fall of the seek current waveform in the acceleration mode, a rise of a seek current waveform in the deceleration mode, and a fall of the seek current waveform in the deceleration mode.

For example, in a case where the aggressor=actuator AC2 and the victim=actuator AC1, and the seek control method of the aggressor is the long distance seek, the acceleration mode, the constant velocity mode, and the deceleration mode are switched in periods TP1, TP2, and TP3 illustrated in FIG. 10 A, respectively.

When the seek current waveform rises in the aggressor period TP1 (acceleration mode), the position error signal of the head H1 on the victim side fluctuates at a relatively fast frequency as illustrated in FIG. 10B. When the seek current waveform falls in the aggressor period TP1, the position error signal of the head H1 on the victim side fluctuates at a relatively slow frequency as illustrated in FIG. 10B.

When the seek current waveform rises in the aggressor period TP3 (deceleration mode), the position error signal of the head H1 on the victim side fluctuates at a relatively fast frequency as illustrated in FIG. 10B. When the seek current waveform falls in the aggressor period TP3, the position error signal of the head H1 on the victim side fluctuates at a relatively slow frequency as illustrated in FIG. 10B.

Figure 11:
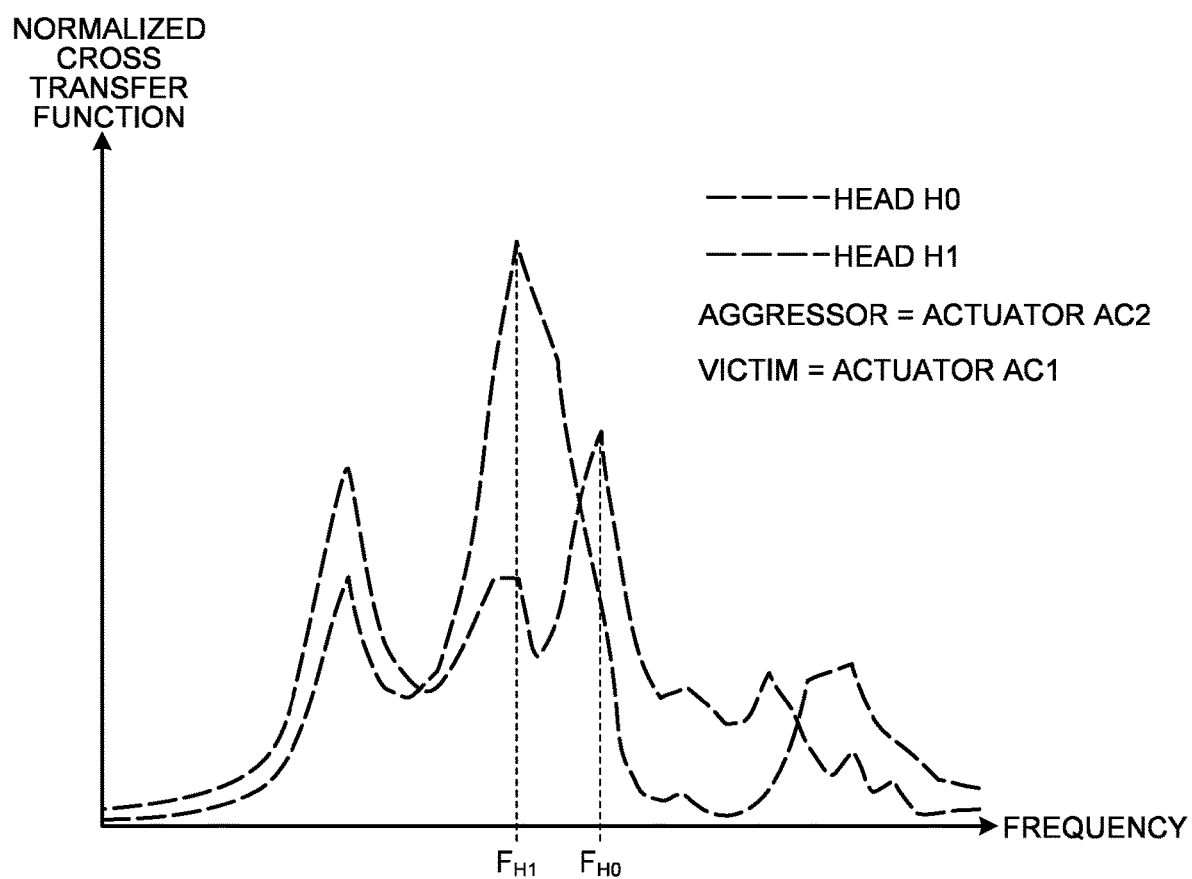
FIG. 11 is a diagram illustrating a difference in transmission characteristics of vibration for each head in the second embodiment.

Further, the cross transfer function greatly varies depending on a Z position of the head H. For example, in a case where the aggressor=actuator AC2 and the victim=actuator AC1, as illustrated in FIG. 11, the head H1 positioned in the middle of the shaft AX1 in the Z direction vibrates at a relatively slow frequency $F_{H1}$ in response to a large mode caused by bending of the shaft AX1 (see FIG. 3). On the other hand, the head H0 close to the uppermost position in the Z direction of the shaft AX1 vibrates at a relatively fast frequency $F_{H0}$ in response to almost no observation of the mode. FIG. 11 is a diagram illustrating a difference in transmission characteristics of vibration for each head.

In a case where the aggressor=actuator AC1 and the victim=actuator AC2, although not illustrated, the head H2 (see FIG. 8) positioned in the middle of the shaft AX1 in the Z direction vibrates at a relatively slow frequency in response to a large mode caused by bending of the shaft AX1 (see FIG. 3). On the other hand, the head H3 close to the lowermost side in the Z direction of the shaft AX1 vibrates at a relatively fast frequency according to the fact that the mode is hardly observed.

For example, in a case where the aggressor=actuator AC2 and the victim=actuator AC1, with respect to the change in the seek current on the aggressor side illustrated in FIG. 12A, the head H0 on the victim side fluctuates at a relatively fast frequency as illustrated in FIG. 12B according to the position at the uppermost position in the Z direction of the shaft AX1. FIGS. 12A and 12B are diagrams illustrating changes in the seek current and the position error signal, respectively, in a case where the aggressor=actuator AC2 and the victim=actuator AC1. The vertical axis in FIG. 12A represents the level of the seek current, the vertical axis in FIG. 12B represents the level of the position error signal, and the horizontal axes in FIGS. 12A and 12B each represent time.

In a case where the aggressor=actuator AC2 and the victim=actuator AC1, with respect to the change in the seek current on the aggressor side illustrated in FIG. 12C, the head H1 on the victim side fluctuates at a relatively slow frequency as illustrated in FIG. 12D according to the position in the middle in the Z direction of the shaft AX1. FIGS. 12C and 12D are diagrams illustrating changes in the seek current and the position error signal, respectively, in a case where the aggressor=actuator AC2 and the victim=actuator AC1. The vertical axis in FIG. 12C represents the level of the seek current, the vertical axis in FIG. 12D represents the level of the position error signal, and the horizontal axes in FIGS. 12C and 12D each represent time.

Thus, the predicted position coefficient updating units 9B4 and 92B4 of the controllers 5 and 52 acquire operation mode information as the information regarding the state of the vibration source. The predicted position coefficient updating units 9B4 and 92B4 change the values of the coefficients a and b for estimating the predicted position of the head H for each head H according to the operation mode information.

For example, coefficient information as illustrated in FIGS. 13A and 13B may be stored in the nonvolatile memory 16, the disk DK1, or the disk DK2. FIGS. 13A and 13B are diagrams illustrating a data structure of coefficient information. FIG. 13A illustrates an operation mode definition table as a part of the coefficient information, and FIG. 13B illustrates a predicted position coefficient table as another part of the coefficient information. In FIG. 13B, the coefficients are indicated by a (head identifier, operation mode) and b (head identifier, operation mode).

In the operation mode definition table illustrated in FIG. 13A, the operation state and the operation mode are associated with each other for plural operation states. For example, an operation state "in tracking" is defined as an operation mode "0". An operation state "fan vibrating" is defined as an operation mode "1". An operation state "acceleration rise in seeking" is defined as an operation mode "2". An operation state "acceleration fall in seeking" is defined as an operation mode "3". An operation state "constant velocity in seeking" is defined as an operation mode "4". An operation state "deceleration rise in seeking" is defined as an operation mode "5". An operation state "deceleration fall in seeking" is defined as an operation mode "6". An operation state "in settling" is a state after seeking until the position of the head H becomes stable, and is defined as an operation mode "M". M is an arbitrary integer of seven or more.

In the predicted position coefficient table illustrated in FIG. 13B, a head identifier (for example, the head number), an operation mode, and a predicted position coefficient are associated with each head for plural operation modes. For the head H0 with the head identifier "0", the coefficients a (0, 0) and b (0, 0) correspond to the operation mode "0", and the coefficients a (0, M) and b (0, M) correspond to the operation mode "M". For the head H1 with the head identifier "1", the coefficients a (1, 0) and b (1, 0) correspond to the operation mode "0", and the coefficients a (1, M) and b (1, M) correspond to the operation mode "M".

Here, with respect to the operation state on the aggressor side, the controller controlling the aggressor side can grasp the state in the past, the present, and the future slightly ahead. Accordingly, the controller on the aggressor side notifies the controller on the victim side of the operation state on the aggressor side. The controller on the victim side can estimate the predicted position by switching the coefficients a and b to be used according to each situation. Thus, it is possible to minimize the performance deterioration while preventing the shifted writing.

Figure 14:
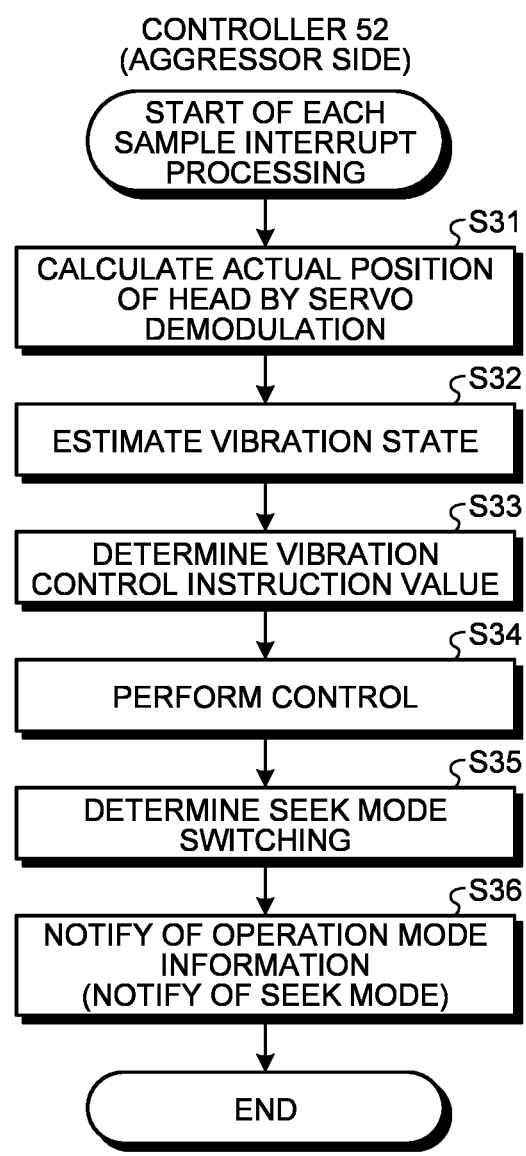
FIG. 14 is a flowchart illustrating an operation in seeking of the disk device according to the second embodiment.

Next, the operation of the disk device 200 will be described with reference to FIG. 14. FIG. 14 is a flowchart illustrating an operation in seeking of the disk device 200. FIG. 14 illustrates an operation of the controller 52 on the aggressor side in seeking in a case where the aggressor=actuator AC2 and the victim=actuator AC1. The disk device 200 can perform the operation illustrated in FIG. 14 as interrupt processing for each sample timing while the head H is in seeking.

The controller 52 calculates the actual position of the head H by the servo demodulation in seeking (S31). The controller 52 reads the servo information from the servo region SR via the read head of the head H. The controller 52 demodulates the position error signal according to the servo information. The position error signal indicates a relative position of the head H from the center of the track TR. The controller 52 obtains the current actual position of the head H according to the position error signal.

The controller 52 acquires the detection results of the sensors such as the RV sensors 11A and 11B via the controller 5 and the controller communication unit 17, and estimates the vibration state of the vibration source according to the detection results of the sensors (S32). The controller 52 may estimate the amplitude and direction of vibration as the state of the vibration source. The controller 52 determines a vibration control instruction value so as to suppress vibration according to the estimated vibration state (S33), and performs control according to the vibration control instruction value (S34). As the control, the controller 52 may perform vibration control to vibrate the actuator AC2 so as to cancel the influence of vibration. The controller 52 performs switching determination of the seek mode according to the progress state of the seek control (S35). For example, if the current seek mode is the acceleration mode, the controller 52 determines whether or not to switch from the acceleration mode to the constant velocity mode. If the current seek mode is the constant velocity mode, the controller 52 determines whether or not to switch from the constant velocity mode to the deceleration mode. The controller 52 notifies the controller 5 on the victim side of the operation mode information as necessary (S36). For example, in a case where it is determined in S35 to switch from the acceleration mode to the constant velocity mode, the controller 52 notifies the controller 5 of the operation mode information indicating that the seek mode after switching is the constant velocity mode. In a case where it is determined in S35 to switch from the constant velocity mode to the deceleration mode, the controller 52 notifies the controller 5 of the operation mode information indicating that the seek mode after switching is the deceleration mode.

Figure 15:
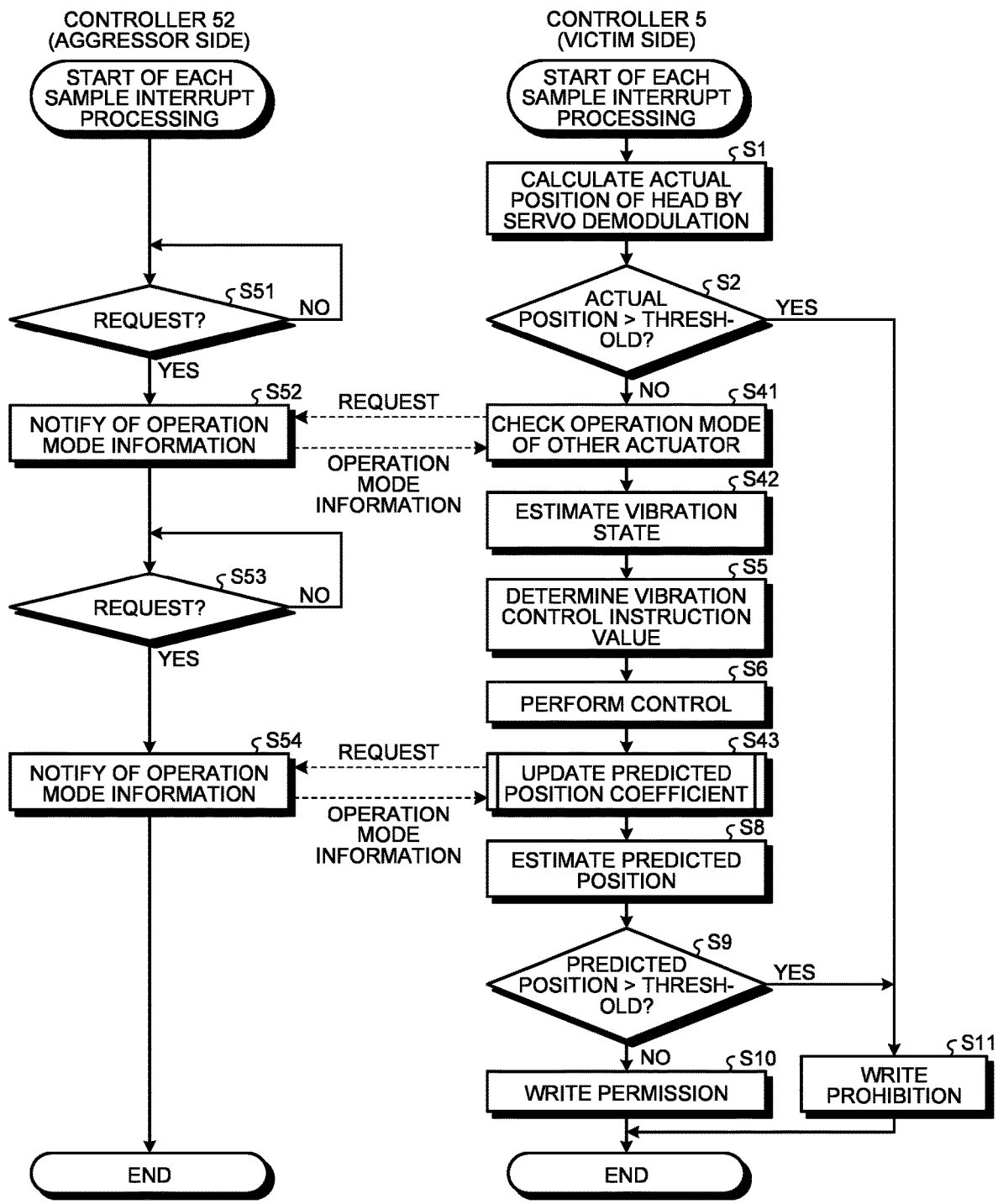
FIG. 15 is a flowchart illustrating an operation in tracking of the disk device according to the second embodiment.

Another operation of the disk device 200 will be described with reference to FIG. 15. FIG. 15 is a flowchart illustrating an operation in tracking of the disk device 200. A left diagram of FIG. 15 illustrates an operation of the controller 52 on the aggressor side in an arbitrary state in a case where the aggressor=actuator AC2 and the victim=actuator AC1. The controller 52 can perform the operation illustrated in the left diagram of FIG. 15 as interrupt processing for each sample timing in an arbitrary state. A right diagram of FIG. 15 illustrates the operation of the controller 5 on the victim side in tracking in a case where the aggressor=actuator AC2 and the victim=actuator AC1. The controller 5 can perform the operation illustrated in the right diagram of FIG. 15 as interrupt processing for each sample timing in a state where the head H is made to track on the target track TR.

After performing the processing of S1 and S2, the controller 5 checks the operation mode of the other actuator AC (S41). The controller 5 transmits a transmission request for the operation mode information to the controller 52 via the controller communication unit 17. The controller 52 waits until the transmission request for the operation mode information is received (No in S51), and transmits, upon receiving the transmission request for the operation mode information (Yes in S51), the operation mode information of the actuator AC2 to the controller 5 via the controller communication unit 17 (S52). The controller 5 receives the operation mode information. The controller 5 estimates the vibration state of the vibration source according to the operation mode information (S42). The operation mode information is information indicating an operation state of the actuator AC2.

Figure 16:
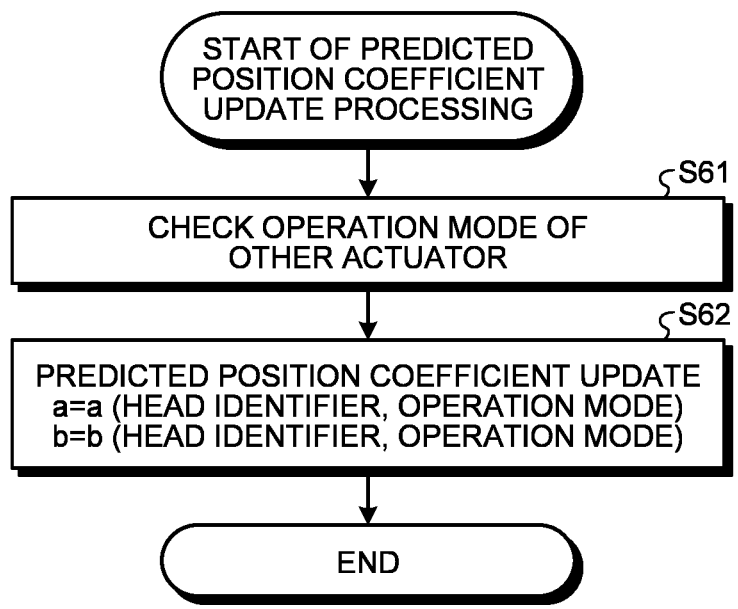
FIG. 16 is a flowchart illustrating predicted position coefficient update processing in the second embodiment.

After performing the processing of S5 and S6, the controller 5 performs predicted position coefficient update processing (S43). The controller 5 may perform the processes of S61 to S62 illustrated in FIG. 16 as the predicted position coefficient update processing. FIG. 16 is a flowchart illustrating the predicted position coefficient update processing.

The controller 5 checks the operation mode of the other actuator AC (S61). The controller 5 transmits a transmission request for the operation mode information to the controller 52 via the controller communication unit 17. The controller 52 waits until the transmission request for the operation mode information is received (No in S53), and transmits, upon receiving the transmission request for the operation mode information (Yes in S53), the operation mode information of the actuator AC2 to the controller 5 via the controller communication unit 17 (S54). The controller 5 receives the operation mode information.

The controller 5 updates the values of the coefficients a and b for obtaining the predicted position for each head H according to the operation mode information (S62). The controller 5 may update the values of the coefficients a and b with reference to the coefficient information as illustrated in FIGS. 13A and 13B according to the operation mode of the actuator AC2 indicated by the operation mode information.

For example, when the heads H0 and H1 are in tracking by the actuator AC2, the predicted position coefficient updating unit 9B4 refers to the operation mode definition table illustrated in FIG. 13A and specifies the operation mode as "0". The predicted position coefficient updating unit 9B4 refers to the predicted position coefficient table illustrated in FIG. 13B, updates the coefficients of the head H0 to a (0, 0) and b (0, 0) corresponding to the operation mode "0", and updates the coefficients of the head H1 to a (1, 0) and b (1, 0) corresponding to the operation mode "0".

Alternatively, when the waveform rises in the acceleration mode while the heads H0 and H1 are in seeking by the actuator AC2, the predicted position coefficient updating unit 9B4 refers to the operation mode definition table illustrated in FIG. 13A and specifies the operation mode as "2". The predicted position coefficient updating unit 9B4 refers to the predicted position coefficient table illustrated in FIG. 13B, updates the coefficients of the head H0 to a (0, 2) and b (0, 2) corresponding to the operation mode "0", and updates the coefficients of the head H1 to a (1, 2) and b (1, 2) corresponding to the operation mode "0".

Thereafter, as illustrated in FIG. 15, the controller 5 performs the processing of S8 and subsequent steps.

As described above, in the second embodiment, in the disk device 200, the controller 5 acquires information regarding the operation state of the other actuator, changes the value of the coefficient for estimating the predicted position of the head H according to the information regarding the operation state of the other actuator, and estimates the predicted position of the head H with the changed value of the coefficient. In this manner, the estimation accuracy of the predicted position can be improved, and thus the accuracy of the write prohibition determination based on the predicted position can be improved. Consequently, it is possible to secure a period during which the head H can properly perform the write operation in the target track TR while preventing the shifted writing in which the head H protrudes from the target track TR to the adjacent track TR and overwrites thereon. That is, in a case where vibration is generated, both improvement in reliability and improvement in performance of the write operation can be achieved, and the write operation can be appropriately performed.

Note that the information regarding the operation state of the other actuator acquired by the controller on the victim side at the time of coefficient update may include information regarding a seek control method or information regarding a seek distance. The information regarding the seek control method includes information indicating whether the seek control method of the other actuator is the long distance seek or the short distance seek. The information regarding the seek distance includes information indicating whether the seek distance of the other actuator is a seek distance corresponding to the long distance seek or a seek distance corresponding to the short distance seek.

Alternatively, the information regarding the operation state of the other actuator acquired by the controller on the victim side at the time of coefficient update may be a first-order differential value of a seek current of the other actuator. In this case, the controller on the victim side may estimate the frequency of vibration according to the first-order differential value of the seek current of the other actuator, and update the coefficients a and b with reference to the coefficient information illustrated in FIGS. 5A and 5B.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
    a first disk;
    a first head;
    a first actuator that moves the first head with respect to a first surface of the first disk; and
    a controller that controls positioning of the first head via the first actuator and controls a write operation to the first disk by the first head, wherein
    the controller acquires information regarding a state of a vibration source, changes a value of a coefficient for estimating a predicted position of the first head according to the information regarding the state of the vibration source, estimates a predicted position of the first head with the value of the coefficient changed, performs a write operation by the first head in a case where the predicted position estimated is equal to or less than a threshold, and prohibits the write operation by the first head in a case where the predicted position estimated exceeds the threshold.

2. The disk device according to claim 1, further comprising
    a sensor that detects vibration of the vibration source, wherein
    the controller acquires a detection result of the sensor as information regarding a state of the vibration source.

3. The disk device according to claim 1, wherein
    the controller estimates a frequency of vibration of the vibration source according to the information regarding the state of the vibration source, and changes the value of the coefficient for estimating the predicted position of the first head according to an estimated frequency.

4. The disk device according to claim 3, wherein
the controller has coefficient information in which a frequency of vibration of the vibration source and a value of a coefficient are associated with each other, and changes the value of the coefficient for estimating the predicted position of the first head according to the estimated frequency and the coefficient information.

5. The disk device according to claim 4, wherein
the coefficient information includes
first information in which a frequency range and a frequency level are associated with each other for plural frequency ranges, and
second information in which a frequency level and a value of a coefficient are associated with each other for plural frequency levels, and
the controller specifies a frequency level corresponding to the estimated frequency with reference to the first information, specifies a value of a coefficient corresponding to the specified frequency level with reference to the second information, and changes the value of the coefficient for estimating the predicted position of the first head to the specified value of the coefficient.

6. The disk device according to claim 1, further comprising
a second head, wherein
the first actuator moves the second head with respect to a second surface of the first disk, and
the controller acquires information regarding the state of the vibration source, and changes each of the value of the coefficient for estimating the predicted position of the first head and a value of a coefficient for estimating a predicted position of the second head according to the information regarding the state of the vibration source.

7. The disk device according to claim 6, wherein
the controller estimates a frequency of vibration of the vibration source according to the information regarding the state of the vibration source, and changes each of the value of the coefficient for estimating the predicted position of the first head and the value of the coefficient for estimating the predicted position of the second head according to an estimated frequency.

8. The disk device according to claim 7, wherein
the controller has coefficient information in which a frequency of vibration of the vibration source, an identifier of a head, and a value of a coefficient are associated with each other, and changes each of the value of the coefficient for estimating the predicted position of the first head and the value of the coefficient for estimating the predicted position of the second head according to the estimated frequency and the coefficient information.

9. The disk device according to claim 8, wherein
the coefficient information includes
first information in which a frequency range and a frequency level are associated with each other for plural frequency ranges, and
second information in which an identifier of a head, a frequency level, and a value of a coefficient are associated for plural frequency levels, and
the controller specifies a frequency level corresponding to the estimated frequency with reference to the first information, specifies an identifier of the first head and a value of a first coefficient corresponding to the specified frequency level with reference to the second information, specifies an identifier of the second head and a value of a second coefficient corresponding to the specified frequency level with reference to the second information, changes the value of the coefficient for estimating the predicted position of the first head to the specified value of the first coefficient, and changes the value of the coefficient for estimating the predicted position of the second head to the specified value of the second coefficient.

10. The disk device according to claim 1, further comprising:
a second disk;
a third head;
a second actuator that moves the third head with respect to a first surface of the second disk; and
a second controller that controls positioning of the third head via the second actuator and controls a write operation to the second disk by the third head, wherein
the controller acquires information regarding a state of the second actuator from the second controller, and changes the value of the coefficient for estimating the predicted position of the first head according to the information regarding the state of the second actuator.

11. The disk device according to claim 10, wherein
the second controller acquires information regarding a state of the first actuator from the controller, changes a value of a coefficient for estimating a predicted position of the third head according to the information regarding the state of the first actuator, estimates a predicted position of the third head with the value of the coefficient changed, performs a write operation by the third head in a case where the predicted position estimated is equal to or less than a threshold, and prohibits the write operation by the third head in a case where the predicted position estimated exceeds the threshold.

12. The disk device according to claim 10, wherein
the controller has first coefficient information in which an operation state of another actuator and a value of a coefficient are associated with each other, and changes the value of the coefficient for estimating the predicted position of the first head according to the information regarding the state of the second actuator and the first coefficient information.

13. The disk device according to claim 10, wherein
the controller has first coefficient information in which an operation state of another actuator and a value of a coefficient are associated with each other, and changes the value of the coefficient for estimating the predicted position of the first head according to the information regarding the state of the second actuator and the first coefficient information, and
the second controller has second coefficient information in which an operation state of another actuator and a value of a coefficient are associated with each other, and changes a value of a coefficient for estimating a predicted position of the second head according to the information regarding the state of the first actuator and the second coefficient information.

14. The disk device according to claim 12, wherein
the first coefficient information includes
first information in which an operation state of another actuator and an identifier of the operation state are associated with each other for plural operation states, and
second information in which an identifier of an operation state and a value of a coefficient are associated with each other for identifiers of plural operation states, and the controller specifies an identifier of an operation state corresponding to the information regarding the state of the second actuator with reference to the first information, specifies a value of a coefficient corresponding to the specified identifier of the operation state with reference to the second information, and changes the value of the coefficient for estimating the predicted position of the first head to a value of the specified coefficient.

15. The disk device according to claim 13, wherein
the first coefficient information includes
first information in which an operation state of another actuator and an identifier of the operation state are associated with each other for plural operation states, and
second information in which an identifier of an operation state and a value of a coefficient are associated with each other for identifiers of plural operation states,
the second coefficient information includes
third information in which an operation state of another actuator and an identifier of the operation state are associated with each other for plural operation states, and
fourth information in which an identifier of an operation state and a value of a coefficient are associated with each other for identifiers of plural operation states,
the controller specifies an identifier of an operation state corresponding to the information regarding the state of the second actuator with reference to the first information, specifies a value of a first coefficient corresponding to an identifier of the first head and the specified identifier of the operation state with reference to the second information, specifies a value of a second coefficient corresponding to an identifier of the second head and the specified identifier of the operation state with reference to the second information, changes the value of the coefficient for estimating the predicted position of the first head to the specified value of the first coefficient, and changes the value of the coefficient for estimating the predicted position of the second head to the specified value of the second coefficient, and
the second controller specifies an identifier of an operation state corresponding to the information regarding the state of the first actuator with reference to the third information, specifies a value of a third coefficient corresponding to an identifier of the third head and the specified identifier of the operation state with reference to the fourth information, specifies a value of a fourth coefficient corresponding to an identifier of the fourth head and the specified identifier of the operation state with reference to the fourth information, changes a value of a coefficient for estimating a predicted position of the third head to the specified value of the third coefficient, and changes a value of a coefficient for estimating a predicted position of the fourth head to the specified value of the fourth coefficient.

16. The disk device according to claim 10, further comprising:
a second head; and
a fourth head, wherein
the first actuator moves the second head with respect to a second surface of the first disk,
the second actuator moves the fourth head with respect to a second surface of the second disk,
the controller acquires information regarding the state of the second actuator from the second controller, and changes each of the value of the coefficient for estimating the predicted position of the first head and a value of a coefficient for estimating a predicted position of the second head according to the information regarding the state of the second actuator, and
the second controller acquires information regarding the state of the first actuator from the controller, and changes each of a value of a coefficient for estimating a predicted position of the third head and a value of a coefficient for estimating a predicted position of the fourth head according to the information regarding the state of the first actuator.

17. The disk device according to claim 16, wherein
the controller has first coefficient information in which an operation state of another actuator, an identifier of a head, and a value of a coefficient are associated with each other, and changes the value of the coefficient for estimating the predicted position of the first head and a value of a coefficient for estimating a predicted position of the second head according to the information regarding the state of the second actuator and the first coefficient information, and
the second controller has second coefficient information in which an operation state of another actuator, an identifier of a head, and a value of a coefficient are associated with each other, and changes a value of a coefficient for estimating a predicted position of the third head and a value of a coefficient for estimating a predicted position of the fourth head according to the information regarding the state of the first actuator and the second coefficient information.

18. The disk device according to claim 17, wherein
the first coefficient information includes
first information in which an operation state of another actuator and an identifier of the operation state are associated with each other for plural operation states, and
second information in which the identifier of the head, the identifier of the operation state, and the value of the coefficient are associated with each other for plural operation states,
the second coefficient information includes
third information in which an operation state of another actuator and an identifier of the operation state are associated with each other for plural operation states, and
fourth information in which the identifier of the head, the identifier of the operation state, and the value of the coefficient are associated with each other for plural operation states,
the controller specifies an identifier of an operation state corresponding to the information regarding the state of the second actuator with reference to the first information, specifies a value of a coefficient corresponding to the specified identifier of the operation state with reference to the second information, and changes the value of the coefficient for estimating the predicted position of the first head to the specified value of the coefficient, and
the second controller specifies an identifier of an operation state corresponding to the information regarding the state of the first actuator with reference to the third information, specifies a value of a coefficient corresponding to the specified identifier of the operation state with reference to the fourth information, and changes the value of the coefficient for estimating the predicted position of the third head to a value of the identified coefficient.

19. The disk device according to claim 10, wherein
the state of the second actuator includes
at least one of a seek control method of the second actuator, a change state of a seek current of the second actuator, or a first-order differential value of the seek current of the second actuator.

20. The disk device according to claim 11, wherein
the state of the second actuator includes
at least one of a seek control method of the second actuator, a change state of a seek current of the second actuator, or a first-order differential value of the seek current of the second actuator,
the state of the first actuator includes
at least one of a seek control method of the first actuator, a change state of a seek current of the first actuator, or a first-order differential value of the seek current of the first actuator.

* * * * *